US012695044B2

(12) United States Patent
Casey

(10) Patent No.: US 12,695,044 B2
(45) **Date of Patent: *Jul. 28, 2026**

(54) DEVICES AND METHODS RELATED TO GAS DISCHARGE TUBES

(71) Applicant: Bourns, Inc., Riverside, CA (US)

(72) Inventor: Kelly C. Casey, Corinth, TX (US)

(73) Assignee: Bourns, Inc., Riverside, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/589,318

(22) Filed: Feb. 27, 2024

(65) Prior Publication Data

US 2024/0203681 A1 Jun. 20, 2024

Related U.S. Application Data

(63) Continuation of application No. 17/548,835, filed on Dec. 13, 2021, now Pat. No. 11,948,770, which is a continuation of application No. PCT/US2020/038552, filed on Jun. 18, 2020.

(60) Provisional application No. 62/863,777, filed on Jun. 19, 2019.

(51) Int. Cl.

| | |
|---|---|
| ***H01J 17/18*** | (2012.01) |
| ***H01J 11/12*** | (2012.01) |
| ***H01J 61/30*** | (2006.01) |
| ***H01T 4/02*** | (2006.01) |
| ***H01T 4/10*** | (2006.01) |
| *H01C 7/108* | (2006.01) |

(52) U.S. Cl.

CPC .............. *H01J 17/183* (2013.01); *H01T 4/02* (2013.01); *H01T 4/10* (2013.01); *H01C 7/108* (2013.01); *H01J 11/12* (2013.01); *H01J 61/305* (2013.01)

(58) Field of Classification Search

CPC ......... H01J 17/183; H01J 11/12; H01J 61/305

See application file for complete search history.

(56) References Cited

U.S. PATENT DOCUMENTS

| | | | | |
|---|---|---|---|---|
| 2006/0091807 A1* | 5/2006 | Bertin-Mourot ....... | H05B 33/28 313/493 |
| 2008/0143243 A1* | 6/2008 | Auday .................. | H01J 65/046 313/498 |
| 2010/0253207 A1* | 10/2010 | Joulaud ................ | H01J 61/305 313/484 |

(Continued)

FOREIGN PATENT DOCUMENTS

| | | |
|---|---|---|
| EP | 0893863 A1 | 7/1999 |
| JP | 58-52786 U | 4/1983 |

(Continued)

*Primary Examiner* — Gary A Nash
(74) *Attorney, Agent, or Firm* — Chang & Hale LLP

(57) ABSTRACT

A gas discharge tube (GDT) can include first and second electrodes each including an edge and an inward facing surface, such that the inward facing surfaces face each other. The GDT can further include a sealing portion implemented to join the edge portions of the first and second electrodes to form a chamber between the inward facing surfaces of the first and second electrodes. The GDT can further include an electrically insulating portion implemented to provide a surface that covers a portion of the inward facing surface of each of at least one of the first and second electrodes such that a leakage path between the first and second electrodes includes a path on the surface of the electrically insulating portion.

20 Claims, 27 Drawing Sheets

(56) References Cited

U.S. PATENT DOCUMENTS

| | | | | |
|---|---|---|---|---|
| 2014/0239804 | A1* | 8/2014 | Kelly | H01J 61/305 313/631 |
| 2016/0276146 | A1* | 9/2016 | Heath | H01T 4/12 |

FOREIGN PATENT DOCUMENTS

| | | | |
|---|---|---|---|
| JP | 11-126674 | A | 5/1999 |
| JP | 2016-515282 | A | 5/2016 |
| JP | 2018-512709 | A | 5/2018 |

* cited by examiner

DEVICES AND METHODS RELATED TO GAS DISCHARGE TUBES

CROSS-REFERENCE TO RELATED APPLICATION(S)

This application is a continuation of U.S. application Ser. No. 17/548,835 filed Dec. 13, 2021, entitled GAS DISCHARGE TUBE HAVING ENHANCED RATIO OF LEAKAGE PATH LENGTH TO GAP DIMENSION, which is a continuation of International Application No. PCT/US2020/038552 filed Jun. 18, 2020, entitled GAS DISCHARGE TUBE HAVING ENHANCED RATIO OF LEAKAGE PATH LENGTH TO GAP DIMENSION, which claims priority to U.S. Provisional Application No. 62/863,777 filed Jun. 19, 2019, entitled GAS DISCHARGE TUBE HAVING ENHANCED RATIO OF LEAKAGE PATH LENGTH TO GAP DIMENSION, the benefits of the filing dates of which are hereby claimed and the disclosures of which are hereby expressly incorporated by reference herein in their entirety.

BACKGROUND

Field

The present disclosure relates to gas discharge tubes (GDTs), and related methods and devices.

Description of the Related Art

A gas discharge tube (GDT) is a device having a volume of gas confined between two electrodes. When sufficient potential difference exists between the two electrodes, the gas can ionize to provide a conductive medium to thereby yield a current in the form of an arc.

Based on such an operating principle, GDTs can be configured to provide reliable and effective protection for various applications during electrical disturbances. In some applications, GDTs can be preferable over semiconductor discharge devices due to properties such as low capacitance and low insertion/return losses. Accordingly, GDTs are frequently used in telecommunications and other applications where protection against electrical disturbances such as overvoltages is desired.

SUMMARY

In some implementations, the present disclosure relates to a gas discharge tube (GDT) that includes first and second electrodes each including an edge and an inward facing surface, such that the inward facing surfaces of the first and second electrodes face each other. The GDT further includes a sealing portion implemented to join and seal the edge portions of the inward facing surfaces of the first and second electrodes to define a sealed chamber between the inward facing surfaces of the first and second electrodes. The GDT further includes an electrically insulating portion implemented to provide a surface in the sealed chamber and to cover a portion of the inward facing surface of each of at least one of the first and second electrodes such that a leakage path within the sealed chamber includes the surface of the electrically insulating portion.

In some embodiments, the electrically insulating portion can be implemented for each of both of the first and second electrodes.

In some embodiments, the GDT can further include a spacer implemented between the first and second electrodes. The spacer can include a first side and a second side, and define an opening with an inner wall that extends from the first side to the second side, such that the sealed chamber is further defined by the inner wall. In some embodiments, the spacer can be formed from an electrically insulating material such as a ceramic material. In some embodiments, the leakage path can have a length that is greater than a thickness dimension of the spacer. In some embodiments, the leakage path can have a length that includes a sum of a path associated with each electrically insulating portion and a thickness dimension of the spacer.

In some embodiments, the sealing portion can include a sealing layer implemented between each of the first and second sides of the spacer and the corresponding electrode.

In some embodiments, the sealing layer can be formed from an electrically conducting material. In some embodiments, each electrically insulating portion can extend laterally inward from the inner wall of the opening of the spacer, and the respective sealing layer can be separated from the electrically insulating portion by the electrically insulating material of the spacer.

In some embodiments, the sealing layer can be formed from an electrically insulating material. In some embodiments, the respective electrically insulating portion can be also formed from the electrically insulating material of the sealing layer. In some embodiments, the respective electrically insulating portion and the sealing layer can form a contiguous structure. In some embodiments, the electrically insulating material of the sealing layer can include glass.

In some embodiments, the spacer can be dimensioned to extend laterally from the inner wall to an outer wall that is approximately flush with outer edges of the first and second electrodes.

In some embodiments, the spacer can be dimensioned to extend laterally from the inner wall to an outer wall that is laterally beyond outer edges of the first and second electrodes. The spacer can include a score feature at a corner of the outer wall on at least one of the first and second sides, with the score feature resulting from singulation of the spacer from another spacer. The spacer extending laterally beyond the outer edges of the first and second electrodes can provide an increased external leakage path length between the first and second electrodes.

In some embodiments, the sealing portion can be formed from an electrically insulating material and configured to join and seal the first and second electrodes directly without a spacer. Each electrically insulating portion can extend laterally inward from sealing portion. In some embodiments, each electrically insulating portion can be also formed from the electrically insulating material of the sealing portion. In some embodiments, the electrically insulating portions and the sealing portion can form a contiguous structure. In some embodiments, the electrically insulating material of the sealing portion can include glass.

In some embodiments, each of the first and second electrodes can be formed from a metal layer. Each electrically insulating portion can be dimensioned to expose a discharging portion on the inward facing surface of the respective electrode.

In some embodiments, the discharging portion of the electrode can include one or more layers implemented on the inward facing surface of the metal layer. Such one or more layers can include, a silver ink layer. Such one or more layers can further include a silver texture layer on the silver ink layer. Such one or more layers can further include an emissive coating layer on the silver texture layer.

In some embodiments, the discharging portion of the electrode can include texture features formed on the inward facing surface of the metal layer. The texture features can include stamped metal features formed on the metal layer. In some embodiments, the discharging portion of the electrode can further include an emissive coating layer on the texture features.

In some embodiments, the discharging portion and the portion of the respective inward facing surface covered by the electrically insulating portion can be substantially flat.

In some embodiments, the discharging portion and the portion of the respective inward facing surface covered by the electrically insulating portion can form a concave surface. In some embodiments, the concave surface can include a substantially flat inner portion and an angled outer portion, such that at least a portion of the angled outer portion is covered by the respective electrically insulating portion. In some embodiments, substantially all of the angled outer portion can be covered by the respective electrically insulating portion.

In some implementations, the present disclosure relates to a method for fabricating a gas discharge tube (GDT). The method includes forming or providing first and second electrodes each including an edge and an inward facing surface. The method further includes covering, with an electrically insulating material, a portion of the inward facing surface of each of at least one of the first and second electrodes. The method further includes joining and sealing the edge portions of the inward facing surfaces of the first and second electrodes to define a sealed chamber between the inward facing surfaces of the first and second electrodes, and such that a leakage path within the sealed chamber includes a surface of the electrically insulating material.

In some embodiments, the joining and sealing of the edge portions of the inward facing surfaces of the first and second electrodes can include providing an electrically insulating spacer between the first and second electrodes, with the spacer having a first side and a second side, and defining an opening with an inner wall that extends from the first side to the second side, such that the sealed chamber is further defined by the inner wall.

In some embodiments, the joining and sealing of the edge portions of the inward facing surfaces of the first and second electrodes can further include forming a sealing layer implemented between each of the first and second sides of the spacer and the corresponding electrode.

In some embodiments, the joining and sealing of the edge portions of the inward facing surfaces of the first and second electrodes can include forming an electrically insulating portion to join and seal the first and second electrodes directly without a spacer.

In some implementations, the present disclosure relates to a method for fabricating a plurality of gas discharge tubes (GDTs). The method includes providing or forming an electrically insulating plate defining an array of spacer units, with each spacer unit having a first side and a second side, and defining an opening with an inner wall that extends from the first side to the second side. The method further includes forming or providing first and second electrodes each including an edge and an inward facing surface. The method further includes covering, with an electrically insulating material, a portion of the inward facing surface of each of at least one of the first and second electrodes. The method further includes sealing the opening of each spacer unit with the first and second electrodes, such that the edge portions of the inward facing surfaces of the first and second electrodes to define a sealed chamber between the inward facing surfaces of the first and second electrodes, and such that a leakage path within the sealed chamber includes a surface of the electrically insulating material.

In some embodiments, the method can further include singulating the array of spacer units into a plurality of individual units.

In some embodiments, the method can further include providing or forming a metal sheet having an array of electrode units, and singulating the array of electrode units to provide the first and second electrodes.

In some implementations, the present disclosure relates to a circuit protection device that includes a gas discharge tube (GDT) having first and second electrodes each including an edge and an inward facing surface, such that the inward facing surfaces of the first and second electrodes face each other. The GDT further includes a sealing portion implemented to join and seal the edge portions of the inward facing surfaces of the first and second electrodes to define a sealed chamber between the inward facing surfaces of the first and second electrodes. The GDT further includes an electrically insulating portion implemented to provide a surface in the sealed chamber and to cover a portion of the inward facing surface of each of at least one of the first and second electrodes such that a leakage path within the sealed chamber includes the surface of the electrically insulating portion. The circuit protection device further includes a first clamping device electrically connected to the first electrode of the GDT.

In some embodiments, the first clamping device can be connected directly to the first electrode. In some embodiments, the first clamping device can be a metal oxide varistor (MOV) having first and second electrodes, and a metal oxide layer implemented between the first and second electrodes. In some embodiments, one of the first and second electrodes of the MOV can be configured as a terminal of the circuit protection device, and the other electrode of the MOV can be a separate electrode electrically connected to the first electrode of the GDT. In some embodiments, one of the first and second electrodes of the MOV can be configured as a terminal of the circuit protection device, and the first electrode of the GDT can be configured as the other electrode of the MOV.

In some embodiments, the circuit protection device can further include a second clamping device electrically connected to the second electrode of the GDT. In some embodiments, the second clamping device can be a metal oxide varistor (MOV) having first and second electrodes, and a metal oxide layer implemented between the first and second electrodes.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

A gas discharge tube (GDT) is a device having a sealed gas chamber with opposing electrodes. When such a GDT is subjected to an electrical condition such as an overvoltage condition, arcing occurs between the electrodes and through the sealed gas, thereby discharging the overvoltage condition. Thus, a GDT design can include, for example, type of gas, gap dimension between the electrodes, overall device dimensions, for the intended usage of the GDT.

In a typical GDT, a leakage current can exist between the electrodes. Such a leakage current typically follows a leakage path along various surfaces of the sealed chamber, from one electrode to the other electrode. In many GDT applications, it is desirable to have such a leakage current reduced. To achieve such a reduction in leakage current, the corresponding leakage path can be increased. In some embodiments, it is desirable to have a long leakage path relative to a corresponding electrode gap dimension.

Figure 1A:
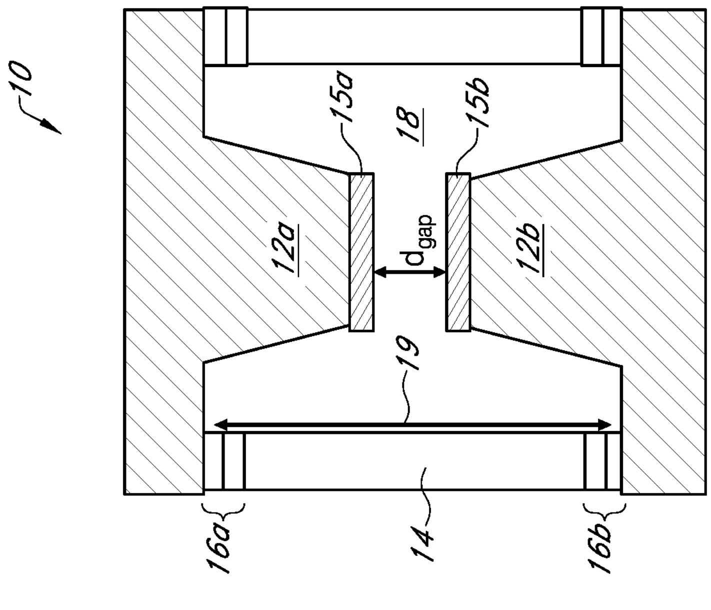
FIG. 1A shows a gas discharge tube (GDT) having a leakage path that includes a thickness dimension of a relatively thick spacer.
Figure 1B:
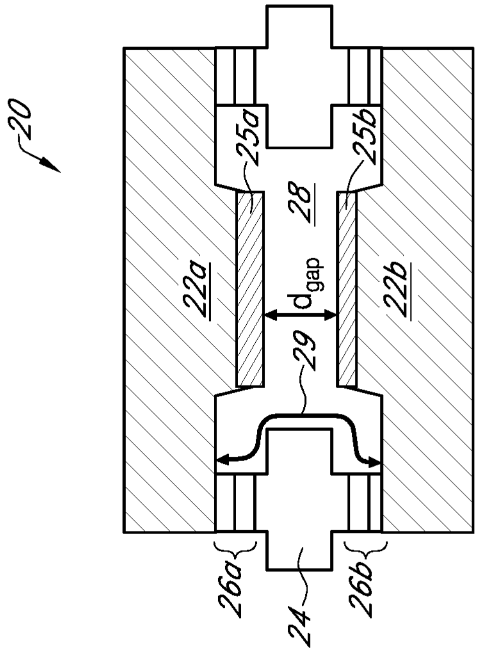
FIG. 1B shows a GDT that is thinner than the example of FIG. 1A, where a spacer is shown to include an inward protrusion so as to provide an increase in leakage path length for a reduced spacer thickness.

FIGS. 1A and 1B show examples of how a leakage path can be increased to reduce leakage current. For example, FIG. 1A shows a GDT 10 having a leakage path 19 that includes a thickness dimension of a relatively thick spacer 14. Such a spacer is shown to join first and second electrodes 12*a*, 12*b* with respective seals 16*a*, 16*b*, so as to form a sealed chamber 18. In such a configuration, the electrodes 12*a*, 12*b* (having optional emissive coatings 15*a*, 15*b*) can protrude toward each other so as to provide a desired gap dimension $d_{gap}$. One can see that in such a configuration, the relatively thick spacer 14 results in the GDT 10 being relatively thick.

In another example, FIG. 1B shows a GDT 20 that is thinner than the example of FIG. 1A. In the example of FIG. 1B, a spacer 24 is shown to include an inward protrusion so as to provide an increase in leakage path length for a reduced spacer thickness. Such a spacer is shown to join first and second electrodes 22*a*, 22*b* with respective seals 26*a*, 26*b*, so as to form a sealed chamber 28. In the example of FIG. 1B, the electrodes 22*a*, 22*b* (having optional emissive coatings 25*a*, 25*b*) do not need to protrude toward each other (when compared to the example of FIG. 1A) to provide a desired gap dimension $d_{gap}$, since the spacer thickness is reduced. It is noted that in the example of FIG. 1B, the spacer 24 having the inward protrusion generally has a more complex profile than, for example, the spacer of FIG. 1A.

In some embodiments, a GDT can have an enhanced leakage path length while utilizing a relatively thin and simple spacer profile. As described herein, such a GDT can also desirably include relatively simple electrodes.

Figure 2:
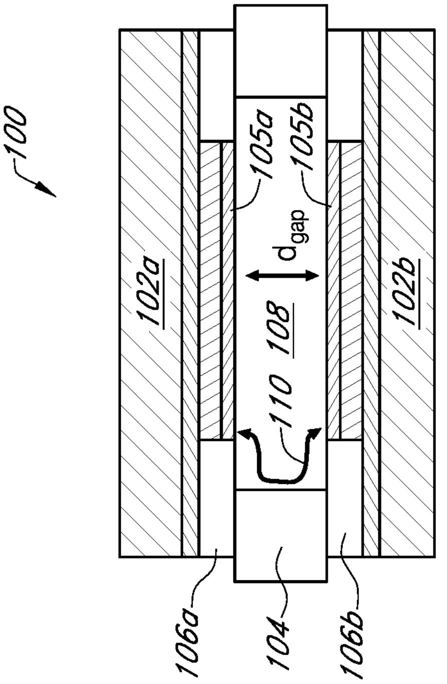
FIG. 2 shows an example of a GDT having an enhanced leakage path length while utilizing a relatively thin and simple spacer profile.

For example, FIG. 2 shows a GDT 100 having upper and lower electrodes 102*a*, 102*b* that can be formed from relatively simple structures such as flat conductive plates. As described herein, discharging portions of such electrodes can be implemented with one or more layers 105*a*, 105*b* formed on respective flat conductive plates.

In the example of FIG. 2, each electrode (102*a* or 102*b*) includes a discharging portion that protrudes slightly towards the opposing discharging portion of the other electrode (102*b* or 102*a*), so as to provides a desired gap dimension $d_{gap}$. If a flat spacer with an opening is implemented so that the inner wall of the opening is at or inward of the discharging portion's edge, the resulting leakage path length will essentially be the thickness of the flat spacer.

However, and as shown in the example of FIG. 2, if an inner wall of an opening of a flat spacer 104 is positioned outward from the discharging portion's edge, a resulting leakage path 110 will include the thickness of the flat spacer 104, as well as a lateral offset (provided by a portion of a respective insulator seal 106*a*, 106*b*) from each discharging portion's edge to the inner wall of the opening of the flat spacer 104. In some embodiments, and as described herein, the insulator seal (106*a*, 106*b*) associated with each electrode (102*a*, 102*b*) can include a surface of an insulating material (e.g., glass) to provide the foregoing lateral offset for the leakage path 110.

In the example of FIG. 2, the inner wall of the opening of the spacer 104, portions of the insulator seals 106*a*, 106*b*, and the discharging portion of the electrodes 102*a*, 102*b* are shown to form a sealed chamber 108. Additional examples related to the GDT 100 of FIG. 2 are described herein in greater detail.

Figure 3:
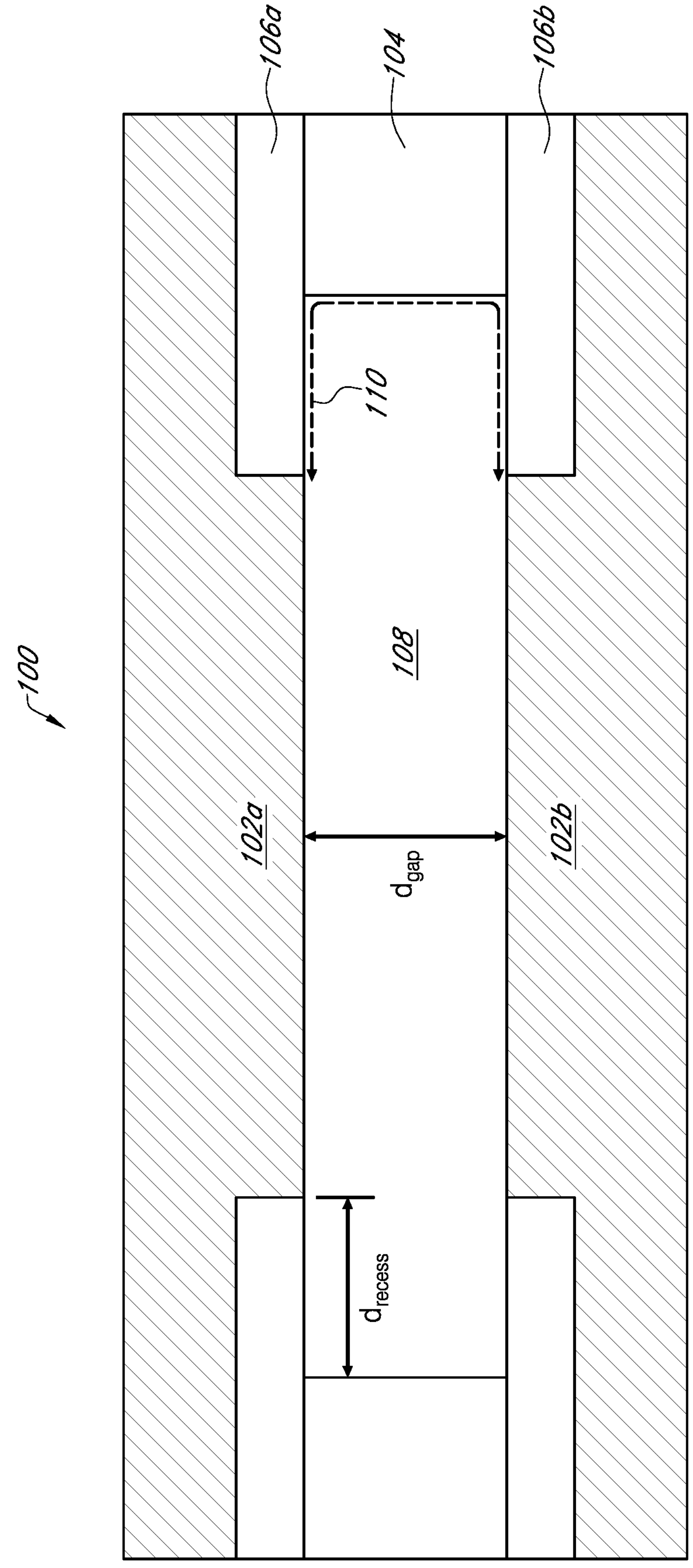
FIG. 3 shows an example of a GDT having an enhanced leakage path length, where a spacer can have an outer wall that is approximately flush with outer walls of electrodes.
Figure 4:
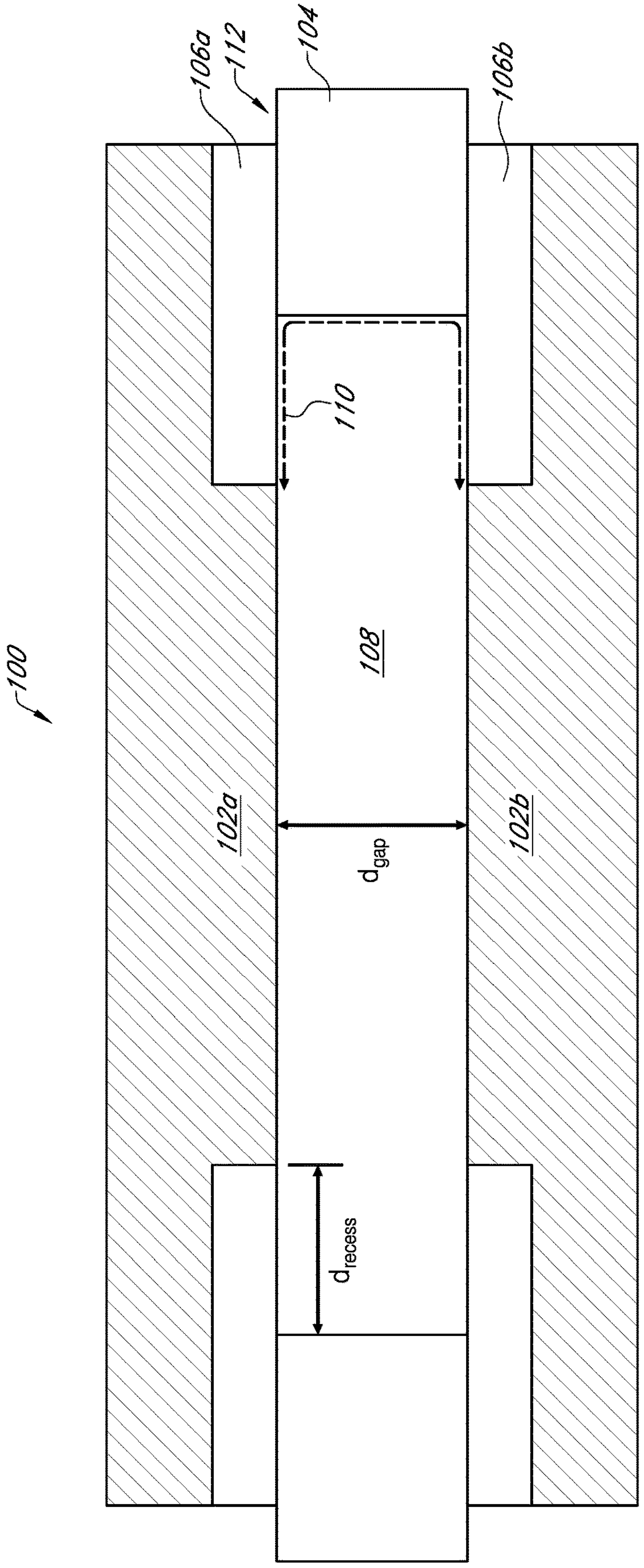
FIG. 4 shows an example of a GDT having an enhanced leakage path length, where a spacer can have an outer wall that is laterally outward of outer walls of electrodes.

FIGS. 3 and 4 show more detailed examples of the increased leakage path length described above in reference to FIG. 2. In each of FIGS. 3 and 4, a GDT 100 is shown to include first and second electrodes 102*a*, 102*b* positioned relative to each other, such that respective discharging portions are separated by a gap dimension $d_{gap}$. For the purpose of description, it will be understood that a discharging portion of an electrode can refer to a situation where an electrical discharge initiates or ends at the discharging portion.

In each of FIGS. 3 and 4, each of the first and second electrodes 102*a*, 102*b* is depicted as including a flat portion and a protruding discharging portion. In some embodiments, and as described herein, such a discharging portion can be implemented with one or more layers formed on the flat portion.

Referring to FIGS. 3 and 4, an electrically insulating seal (106*a* or 106*b*) (also referred to herein as an insulator seal) can be implemented so as to occupy some or all of a space surrounding the laterally outer portion of the corresponding discharging portion. Accordingly, in some embodiments, the protruding discharging portion and the insulator seal (106*a* or 106*b*) can have approximately the same thickness. In such an example configuration, the electrode (102*a* or 102*b*) and the insulator seal (106*a* or 106*b*) can form an approximately flat structure. Although some examples are described herein in the context of such an approximately flat structure, it will be understood that the insulator seal can have a thickness that is greater or lesser that the thickness of the protruding discharging portion.

It will also be understood that a discharging portion of an electrode may or may not be protruding from a conductor surface of the electrode. For example, in some embodiments, a flat portion of a flat conductor surface of an electrode can be surrounded by an electrically insulating seal as described herein, and the exposed portion of such a flat conductor surface can be a discharging portion of the electrode. If one or more layers such as silver texture layer and emissive coating layer is/are formed over such a exposed portion, the resulting layer(s) having a thickness less than, equal to or greater than the surrounding electrically insulating seal can be considered to be a discharging portion of the electrode.

Referring to FIGS. 3 and 4, in some embodiments, the GDT 100 can further include a generally flat spacer 104 having an opening that defines a chamber 108. In each of the examples of FIGS. 3 and 4, the inner wall of the spacer 104 is shown to be recessed outward from the outer edge of the discharging portion of each of the electrodes 102*a*, 102*b*. Accordingly, the resulting recess is shown to have a lateral dimension of $d_{recess}$. Thus, if the discharging portions of the electrodes 102*a*, 102*b* are dimensioned similarly, a leakage path 110 between an outer edge of one discharging portion to an outer edge of the other discharging portion can have a length of approximately $d_{recess}+d_{gap}+d_{recess}$.

It will be understood that in some embodiments, the discharging portions of the electrodes 102*a*, 102*b* may or may not be dimensioned the same.

FIG. 3 shows that in some embodiments, the spacer 104 can have an outer wall that is approximately flush with the outer walls of the electrodes 102*a*, 102*b*.

FIG. 4 shows that in some embodiments, the spacer 104 can have an outer wall that is laterally outward of the outer walls of the electrodes 102*a*, 102*b*. In such a configuration of FIG. 4, the laterally protruding spacer (beyond the outer walls of the electrodes 102*a*, 102*b*) can form a wing-like structure when the GDT 100 is viewed on its side. In some embodiments, such a wing-like structure can facilitate some desirable fabrication processes. Examples of such fabrication processes are described herein in greater detail. It is also noted that the foregoing outer wing-like structure can also provide for a longer leakage path external to the GDT 100.

Figure 5:
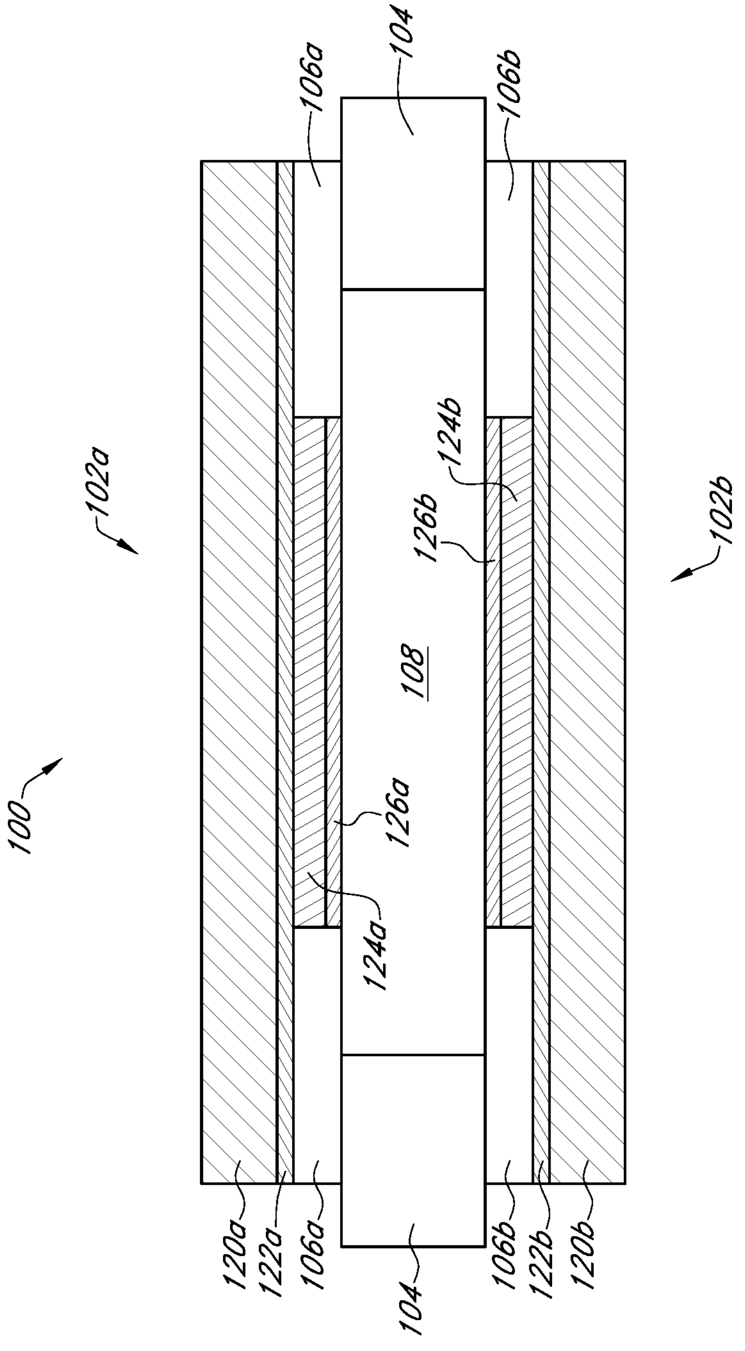
FIG. 5 shows a more specific example of the GDT of FIG. 4.

FIG. 5 shows a more specific example of the GDT of FIG. 4. In the example of FIG. 5, a GDT 100 is shown to include first and second electrodes 102*a*, 102*b* implemented on first and second sides (e.g., upper and lower sides, when oriented as in FIG. 5) of an electrically insulating spacer 104. In some embodiments, the first electrode 102*a* can include a first metal sheet 120*a* (e.g., a flat stamped metal sheet), and a number of layers can be formed on such a metal sheet to provide a discharging portion. For example, a silver ink layer 122*a* can be formed so as to substantially cover one side of the metal sheet 120*a*. A silver texture layer 124*a* and an emissive coating layer 126*a* are shown to be formed on a center portion of the silver ink layer 122*a* so as to form a discharging portion at a center portion of the first electrode 102*a*. It will be understood that such a discharging portion can also be formed so as to be symmetric with respect to a center line extending between the first and second electrodes 102*a*, 102*b*, asymmetric, away from the center portion, etc.

Similarly, and referring to FIG. 5, the second electrode 102*b* can include a second metal sheet 120*b* (e.g., a flat stamped metal sheet), and a number of layers can be formed on such a metal sheet to provide a discharging portion. For example, a silver ink layer 122*b* can be formed so as to substantially cover one side of the metal sheet 120*b*. A silver texture layer 124*b* and an emissive coating layer 126*b* are shown to be formed on a center portion of the silver ink layer 122*b* so as to form a discharging portion at a center portion of the second electrode 102*b*. It will be understood that such a discharging portion can also be formed so as to be symmetric with respect to a center line extending between the first and second electrodes 102*a*, 102*b*, asymmetric, away from the center portion, etc. It will also be understood that the various layers of the second electrode 102*b* may or may not be same as the various layers of the first electrode 102*a*.

In some embodiments, electrodes for a GDT having one or more features as described herein (such as the example of FIG. 5) can be implemented as metal electrodes (e.g., copper or Alloy 42 metal) without use of a silver ink or texture. In such an embodiment, texture features can be stamped on the metal electrode. Such stamping of the texture features can be achieved during the formation of the electrode itself (in an example implementation where the electrode is a stamped metal electrode), or in a separate step before or after the electrode-formation step. In some embodiments, an emissive coating may or may not be provided on the stamped texture features of the metal electrode.

In the example of FIG. 5, the electrically insulating spacer 104 is shown to define an opening having an inner wall of the spacer 104. In some embodiments, such an electrically insulating spacer can be, for example, a ceramic spacer.

FIG. 5 shows that in some embodiments, an electrically insulating seal can be provided for each of the first and second electrodes 102*a*, 102*b*. For example, a first electrically insulating seal 106*a* (e.g., a glass seal) can be implemented on the silver ink layer 122*a* so as to laterally surround the discharging portion that includes the silver texture layer 124*a* and the emissive coating layer 126*a*. In another example, and in the context of the foregoing stamped metal electrode configuration, a first electrically insulating seal 106*a* (e.g., a glass seal) can be implemented on the metal electrode itself so as to laterally surround the discharging portion that includes the stamped texture features and the emissive coating layer (if implemented). Such an electrically insulating seal can be dimensioned so that its lateral inner edge defines an outer edge of the discharging portion, and a lateral outer portion engages the corresponding side (e.g., upper side) of the electrically insulating spacer 104. Accordingly, the outer edge of the discharging portion of the first electrode 102*a* is shown to be laterally separated from the inner wall of the opening of the electrically insulating spacer 104, by an electrically insulating material of the first seal 106*a*.

Similarly, a second electrically insulating seal 106*b* (e.g., a glass seal) can be implemented on the silver ink layer 122*b* so as to laterally surround the discharging portion that includes the silver texture layer 124*b* and the emissive coating layer 126*b*. In the context of the foregoing stamped metal electrode configuration, a second electrically insulating seal 106*b* (e.g., a glass seal) can be implemented on the metal electrode itself so as to laterally surround the discharging portion that includes the stamped texture features and the emissive coating layer (if implemented). Such an electrically insulating seal can be dimensioned so that its lateral inner edge defines outer edge of the discharging portion, and a lateral outer portion engages the corresponding side (e.g., lower side) of the electrically insulating spacer 104. Accordingly, the outer edge of the discharging portion of the second electrode 102*b* is shown to be laterally separated from the inner wall of the opening of the electrically insulating spacer 104, by an electrically insulating material of the second seal 106*b*. It will be understood that the first and second electrically insulating seals 106*a*, 106*b* may or may not be the same.

Configured in the foregoing manner, the inner wall of the opening of the spacer 104, the lateral inner portions of the first and second electrically insulating seals 106*a*, 106*b*, and the discharging portions of the first and second electrodes 102*a*, 102*b* are shown to define a sealed chamber 108. As described herein, such a sealed chamber can be filled with a gas or a mixture of gases to provide a desired discharging functionality.

In the example of FIG. 5, the inner wall of the opening of the spacer 104 is shown to be laterally recessed from the outer edges of the first and second discharging portions (e.g., by a lateral dimension of the lateral inner portions of the first and second electrically insulating seals 106*a*, 106*b*). Accordingly, such a lateral dimension associated with each of the first and second electrically insulating seals 106*a*, 106*b* can provide an increase in leakage path length between discharging portions of the first and second electrodes 102*a*, 102*b*.

In the example of FIG. 5, the lateral outer portion of the spacer 104 is shown to extend laterally outward beyond a wall defined by the first and second electrodes 102*a*, 102*b*. In some embodiments, and as described herein, such a lateral extension of the spacer 104 can be utilized to facilitate fabrication of a plurality of GDTs. Also as described herein, the lateral extension of the spacer 104 as an outer wing-like structure can also provide for a longer leakage path external to the corresponding GDT.

In the example of FIG. 5, a single electrically insulating structure (e.g., a glass seal) provides both of sealing functionality (between one electrode and the corresponding side of the spacer) and lateral increase in leakage path length (internally and/or externally). In some embodiments, either or both of such functionalities can also be implemented in different manners.

Figure 6:
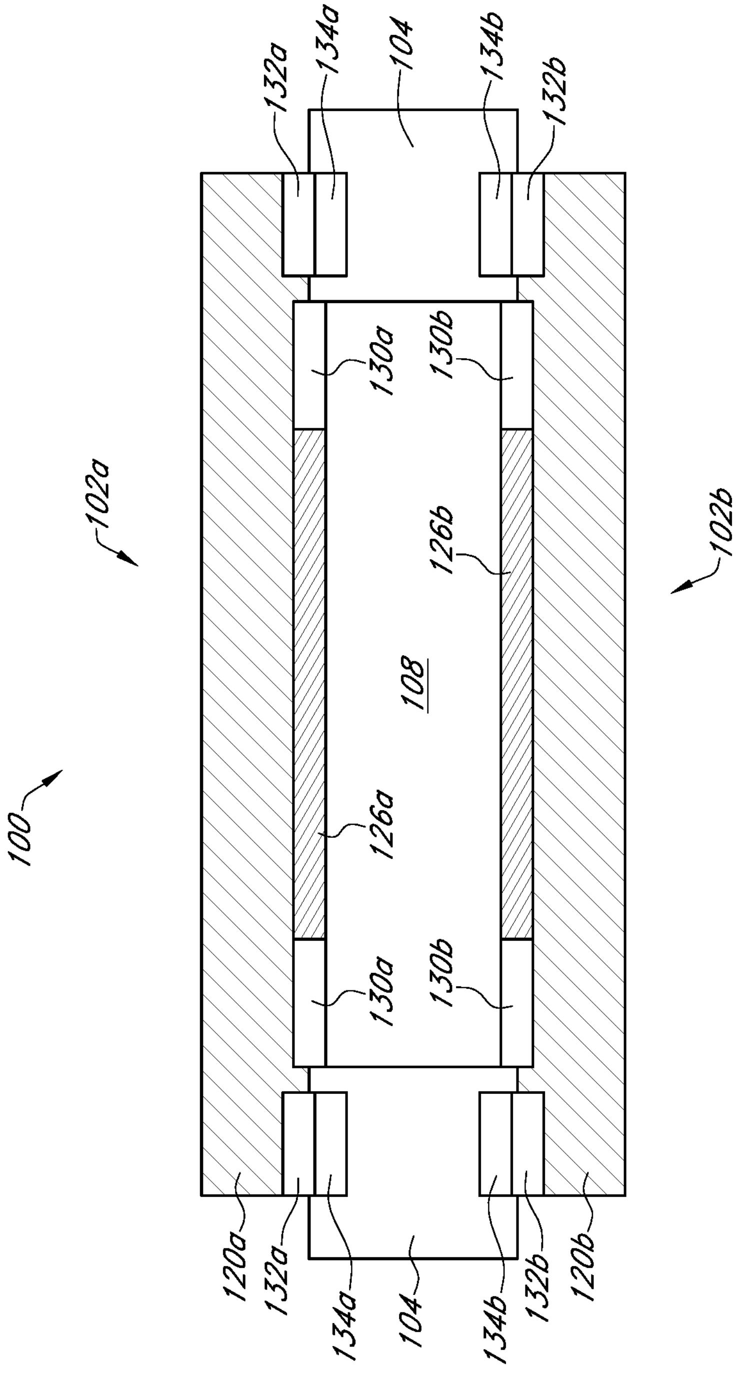
FIG. 6 shows that in some embodiments, a GDT can include separate structures for providing sealing functionality and for providing lateral increase in leakage path length.

For example, FIG. 6 shows that in some embodiments, a GDT 100 can include separate structures for providing sealing functionality and for providing lateral increase in leakage path length. In the example of FIG. 6, each of first and second electrodes 102*a*, 102*b* can include a metal sheet (120*a* or 120*b*) (e.g., a flat stamped metal sheet), and one or more layers can be formed on such a metal sheet to provide a discharging portion. For example, an emissive coating layer (126*a* or 126*b*) can be formed on a center portion of the metal sheet (120*a* or 120*b*) so as to form a discharging portion at a center portion of the electrode (102*a* or 102*b*). It will be understood that such a discharging portion can also be formed so as to be symmetric with respect to a center line extending between the first and second electrodes 102*a*, 102*b*, asymmetric, away from the center portion, etc.

In the example of FIG. 6, an electrically insulating layer can be provided for each of the first and second electrodes 102*a*, 102*b*. For example, a first electrically insulating layer 130*a* (e.g., a glass layer) can be implemented on the metal sheet 120*a* so as to laterally surround the discharging portion that includes the emissive coating layer 126*a*. Such an electrically insulating layer can be dimensioned to laterally separate an outer edge of the emissive coating layer 126*a* and an inner wall of an opening defined by an electrically insulating spacer 104. It is noted that the first electrically insulating layer 130*a* does not provide a sealing functionality between the electrically insulating spacer 104 and the metal sheet 120*a* of the first electrode 102*a*. It is also noted that in some embodiments, the first electrically insulating layer 130*a* and the electrically insulating spacer 104 can be configured such that a junction therebetween does not allow a portion of the metal sheet 120*a* to peek through the junction and corrupt the leakage path. In some embodiments, such a junction can include a configuration where an outer portion of the first electrically insulating layer 130*a* engages an inner portion of the electrically insulating spacer 104 sufficiently to prevent corruption of the leakage path between the first electrically insulating layer 130*a* and the electrically insulating spacer 104.

Similarly, a second electrically insulating layer 130*b* (e.g., a glass layer) can be implemented on the metal sheet 120*b* so as to laterally surround the discharging portion that includes the emissive coating layer 126*b*. Such an electrically insulating layer can be dimensioned to laterally separate an outer edge of the emissive coating layer 126*b* and the inner wall of the opening defined by the electrically insulating spacer 104. It is noted that the second electrically insulating layer 130*b* does not provide a sealing functionality between the electrically insulating spacer 104 and the metal sheet 120*b* of the first electrode 102*b*. It is also noted that in some embodiments, the second electrically insulating layer 130*b* and the electrically insulating spacer 104 can be configured such that a junction therebetween does not allow a portion of the metal sheet 120*b* to peek through the junction and corrupt the leakage path. In some embodiments, such a junction can include a configuration where an outer portion of the second electrically insulating layer 130b engages an inner portion of the electrically insulating spacer 104 sufficiently to prevent corruption of the leakage path between the second electrically insulating layer 130b and the electrically insulating spacer 104.

Configured in the foregoing manner, the first and second electrically insulating layers 130a, 130b can provide respective lateral increases in leakage path length between the first and second electrodes 102a, 102b.

In the example of FIG. 6, sealing functionality is shown to be provided by structures other than the electrically insulating layers 130a, 130b. For example, a sealing assembly between one side (e.g., upper side when oriented as in FIG. 6) of the electrically insulating spacer 104 and the first metal sheet 120a can include an interface layer 132a (e.g., CuSil alloy brazing material) formed on the first metal sheet 120a, and an interface layer 134a (e.g., tungsten metallization layer) formed on the electrically insulating spacer 104. Similarly, a sealing assembly between the other side (e.g., lower side) of the electrically insulating spacer 104 and the second metal sheet 120b can include an interface layer 132b (e.g., CuSil alloy brazing material) formed on the second metal sheet 120b, and an interface layer 134b (e.g., tungsten metallization layer) formed on the electrically insulating spacer 104.

It is noted that in the example of FIG. 6, each of the sealing assemblies (e.g., 132a/134a and 132b/134b) can be electrically conducting or electrically non-conducting. Even if the sealing assembly is electrically conducting, it is electrically isolated from the leakage path between the discharging portions of the two electrodes 102a, 102b.

In some embodiments, the foregoing sealing assemblies can provide the sealing functionality by having the respective interface layers joined together (e.g., with application of heat) during a fabrication process. Once sealed, the inner wall of the spacer 104, the first and second electrically insulating layers 130a, 130b, and the first and second discharging portions are shown to define a sealed chamber 108. As described herein, such a sealed chamber can be filled with a gas or a mixture of gases to provide a desired discharging functionality.

In the example of FIG. 6, it is noted that the spacer 104 is an electrically insulating spacer (e.g., a ceramic spacer). Accordingly, the interface layers 132, 134 can be electrically insulating layers, electrically conducting layers, or some combination thereof. It is noted that if the interface layers 132, 134 are formed from electrically conductive material(s), such layers can be formed to be sufficiently separated from the inner wall of the opening of the spacer 104 so as to provide the sealing functionality but not interfere with electrical properties associated with the first and second electrodes 102a, 102b.

Figure 7:
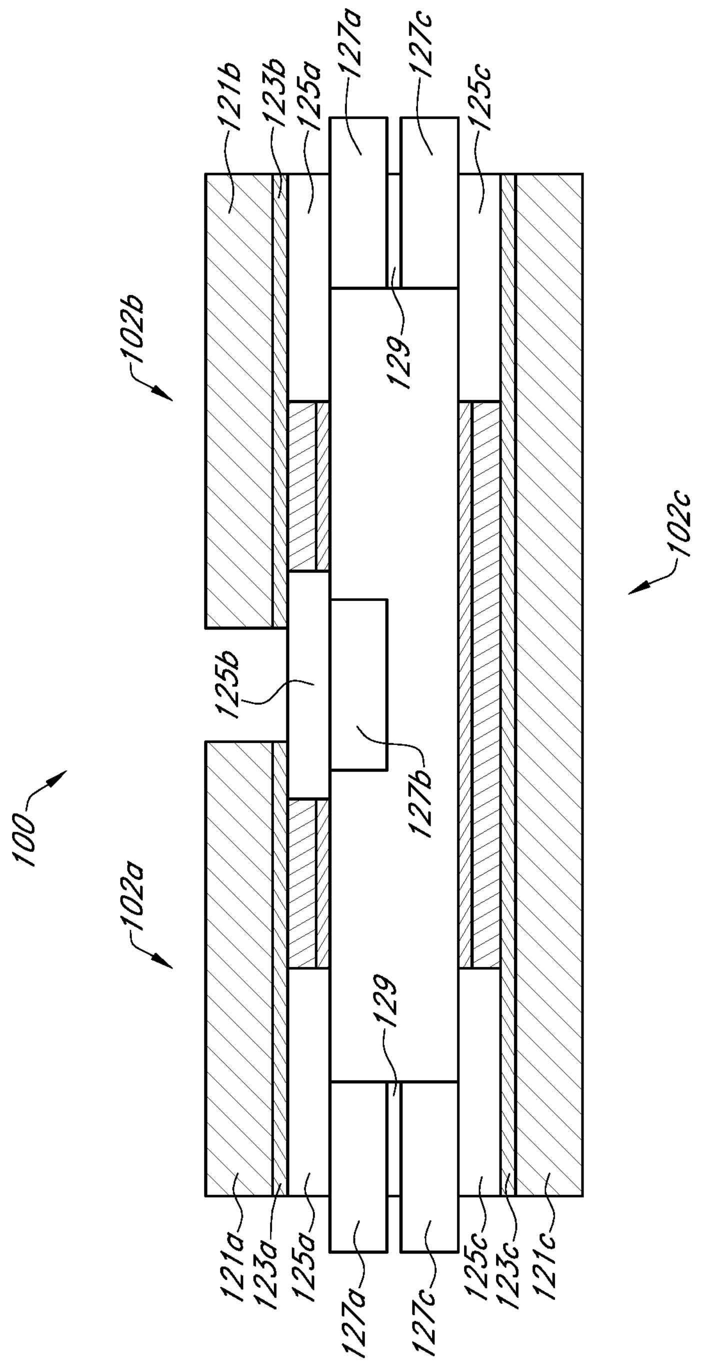
FIG. 7 also shows that in some embodiments, a spacer in a GDT having one or more features as described herein can include more than one layer.

In the examples of FIGS. 5 and 6, each GDT is configured with a single electrode on one side of a spacer and another single electrode on the other side of the spacer. FIG. 7 shows that in some embodiments, a GDT having one or more features as described herein can include more than one electrode on a given side of a spacer. FIG. 7 also shows that in some embodiments, a spacer in a GDT having one or more features as described herein can include more than one layer.

For example, and referring to FIG. 7, two electrodes 102a, 102b are implemented on one side (e.g., upper side when oriented as in FIG. 7) of a spacer assembly, and one electrode 102c is implemented on the other side of the spacer assembly. The spacer assembly is shown to include a first layer 127a and a second layer 127c. Such layers can be electrically insulating layers such as ceramic layers, and can be joined by a seal layer 129 such as a glass seal. The first layer 127a is depicted as including a mid-portion 127b that supports the laterally separated upper electrodes 102a, 102b. In some embodiments, the mid-portion 127b may or may not be connected to the lateral outer portions of the first layer 127a.

Configured in the foregoing manner, lateral outer portion of each of the electrodes 102a, 102b is shown to mate with an outer portion of the first layer 127a, and lateral inner portion of each of the electrodes 102a, 102b is shown to mate with the mid-portion 127b. In the example of FIG. 7, each of the electrodes 102a, 102b can include various layers similar to the example of FIG. 5, so as to form a respective discharging portion. Further, sealing functionality and increase in leakage path length can be provided by sealing portions 125a, 125b similar to the example of FIG. 5.

In the example of FIG. 7, the lower electrode 102c can be configured and mated to the second layer 127c in manners similar to the example of FIG. 5. Configured as shown in FIG. 7, a leakage path associated with any portion of the three example discharging portions (associated with the three electrodes 102a, 102b, 102c) can be increased by a portion of the respective sealing structure (e.g., 125a or 125c) by providing a lateral offset to the nearest inner wall of the insulating layer (e.g., 127a or 127c).

In the examples of FIGS. 5-7, each GDT includes a single sealed chamber. However, it will be understood that a GDT having one or more features as described herein can include more than one sealed chamber. In such a configuration with a plurality of sealed chambers, at least one sealed chamber can have associated with it an increased leakage path length as described herein.

Figure 8A:
FIGS. 8A-8J show various stages of a process that can be utilized to fabricate the example GDT of FIG. 5.
Figure 8B:
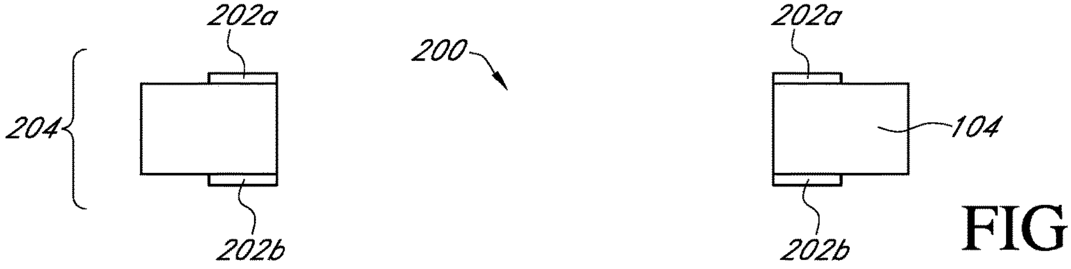

FIGS. 8A-8J show various stages of a process that can be utilized to fabricate the example GDT 100 of FIG. 5. FIGS. 8A and 8B relate to the electrically insulating spacer 104, FIGS. 8C-8G relate to each electrode (102a or 102b), and FIGS. 8H-8J relate to assembly of the electrodes to the electrically insulating spacer.

FIG. 8A shows a side view of an electrically insulating spacer 104 (e.g., ceramic spacer) having an opening 200. In some embodiments, such an opening can be formed for subsequent steps, or can be pre-formed. For the purpose of description of FIGS. 8A-8J, the electrically insulating spacer 104 can be a ceramic spacer; however, it will be understood that such an electrically insulating spacer can be formed from other material(s).

FIG. 8B shows a step where a glass layer 202a is formed on one side of the ceramic spacer 104, and a glass layer 202b is formed on the other side of the ceramic spacer 104, so as to yield an assembly 204. Examples related to formation of such glass layers can be found in U.S. Publication No. 2019/0074162 titled GLASS SEALED GAS DISCHARGE TUBES, which is hereby expressly incorporated by reference herein in its entirety, and its disclosure is to be considered part of the specification of the present application. It will be understood that the layers 202a, 202b can be formed with other materials, including non-glass insulating material(s).

Figure 8C:
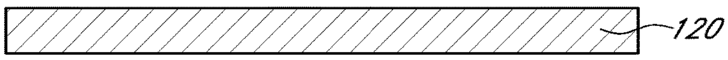

FIG. 8C shows a side view of a metal sheet 120 to be utilized as an electrode. In some embodiments, such a metal sheet can be stamped from a larger sheet or strip of metal.

Figure 8D:
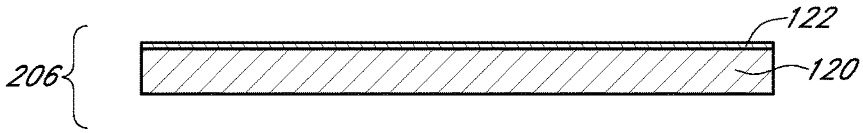

FIG. 8D shows a step where a silver ink layer 122 is formed on one side of the metal sheet 120, so as to yield an assembly 206. In some embodiments, such a silver ink layer can be formed by, for example, printing or spraying followed by a curing step. In some embodiments, and as described herein in reference to FIG. 5, this step can be omitted in a configuration where electrodes are implemented as stamped metal structures.

Figure 8E:
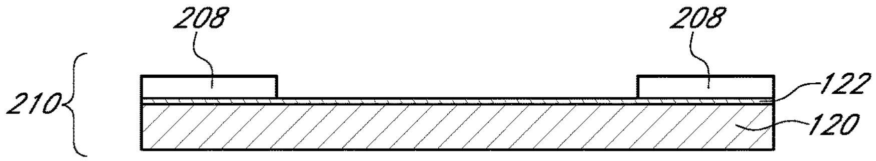

FIG. 8E shows a step where a glass layer 208 is formed on the silver ink layer 122, so as to yield an assembly 210. In some embodiments, such a glass layer can be formed around the periphery of the silver ink layer 122 with a width dimension to provide an increase in leakage path length as described herein. In some embodiments, and as described herein in reference to FIG. 5, the glass layer 208 can be formed around the periphery of the metal sheet 120 (e.g., directly on the metal sheet 120) in a configuration where electrodes are implemented as stamped metal structures.

Figure 8F:
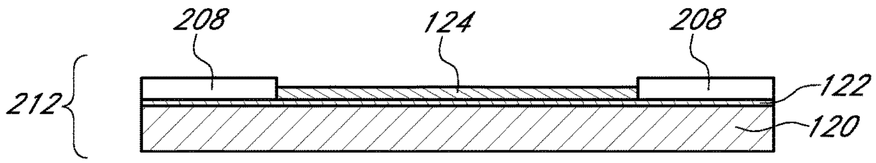

FIG. 8F shows a step where a silver texture layer 124 is formed on the silver ink layer 122 so as to be laterally between the glass layer 122 along the periphery, so as to yield an assembly 212. In some embodiments, and as described herein in reference to FIG. 5, the silver texture layer 124 can be omitted; instead, similar texture features can be formed on the metal sheet 120 (e.g., stamped features) in a configuration where electrodes are implemented as stamped metal structures.

Figure 8G:
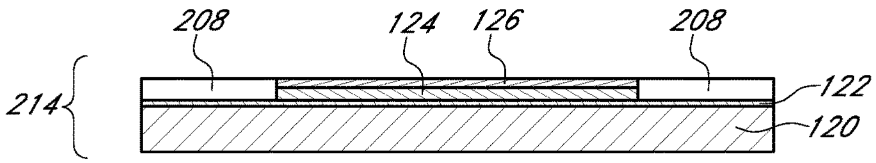

FIG. 8G shows a step where an emissive coating layer 126 is formed on the silver texture layer 124 (or on the stamped features of the corresponding stamped metal electrode) so as to be laterally between the glass layer 122 along the periphery, so as to yield an assembly 214. The assembly 214 can be utilized as either of the first and second electrodes 102*a*, 102*b* of the example of FIG. 5.

Figure 8H:
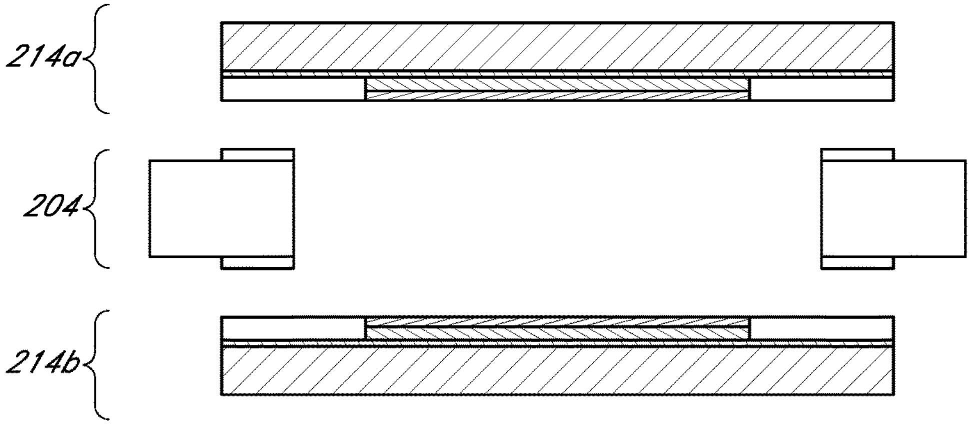

FIG. 8H shows an assembly view where the assembly 204 of FIG. 8B is to be sandwiched between two assemblies 214*a*, 214*b* of FIG. 8G. It will be understood that in some embodiments, the assemblies 214*a*, 214*b* can be mated with the assembly 204 at the same time, mated with the assembly 204 in sequence, or some combination thereof.

Figure 8I:
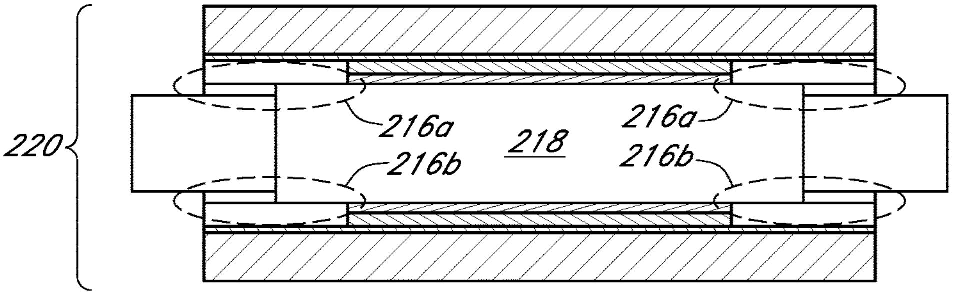

FIG. 8I show an assembly view where the assembly 204 is in engagement with the two assemblies 214*a*, 214*b*, and the mating interfaces (216*a*, 216*b*) are yet to be cured and sealed, so as to yield an assembly 220. During or before formation of such an assembly, desired gas can be introduced to a volume 218 that will become sealed.

Figure 8J:
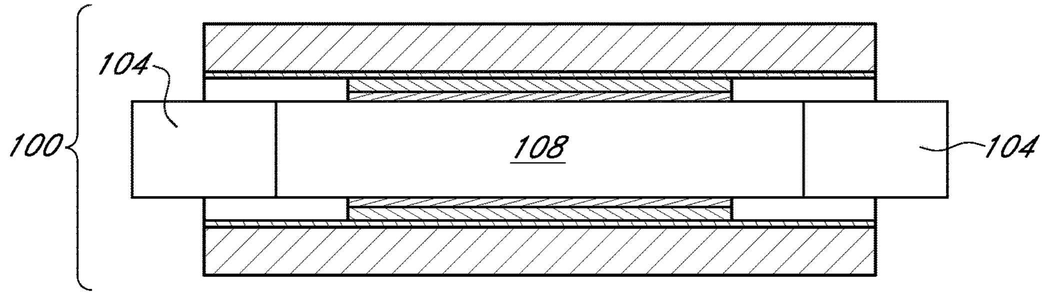

FIG. 8J shows an assembly view where the mating interfaces (216*a*, 216*b* in FIG. 8I) are cured so as to yield a GDT 100 having a sealed chamber 108 and an increased leakage path length that includes a portion of each seal and the inner wall of the opening of the spacer 104, as described herein.

The examples fabrication steps of FIGS. 8A-8J are described in the context of a single unit. It will be understood that a GDT having one or more features as described herein can be fabricated as a standalone unit, as a singulated unit from an array of similar units, or any combination thereof.

FIGS. 9A-9J and 10A-10J show example various stages of a process that can be utilized to fabricate a plurality of GDT devices. FIGS. 9A-9J are plan views of an array or a group of singulated units, and FIGS. 10A-10J are side views (side sectional views when indicated) of the same.

For the purpose of description of FIGS. 9A-9J and 10A-10J, each of such GDT devices is similar to the example GDT 100 of FIG. 5. However, it will be understood that one or more features of such techniques can also be utilized to fabricate a plurality of GDTs having other configurations.

FIGS. 9A, 9B, 10A and 10B relate to array-format processing of electrically insulating spacers 104. FIGS. 9C-9G and 10C-10G relate to array-format processing of electrodes (102*a* or 102*b*). FIGS. 9H-9J and 10H-10J relate to array-format processing of assembly of the electrodes to the electrically insulating spacers.

Figure 9A:
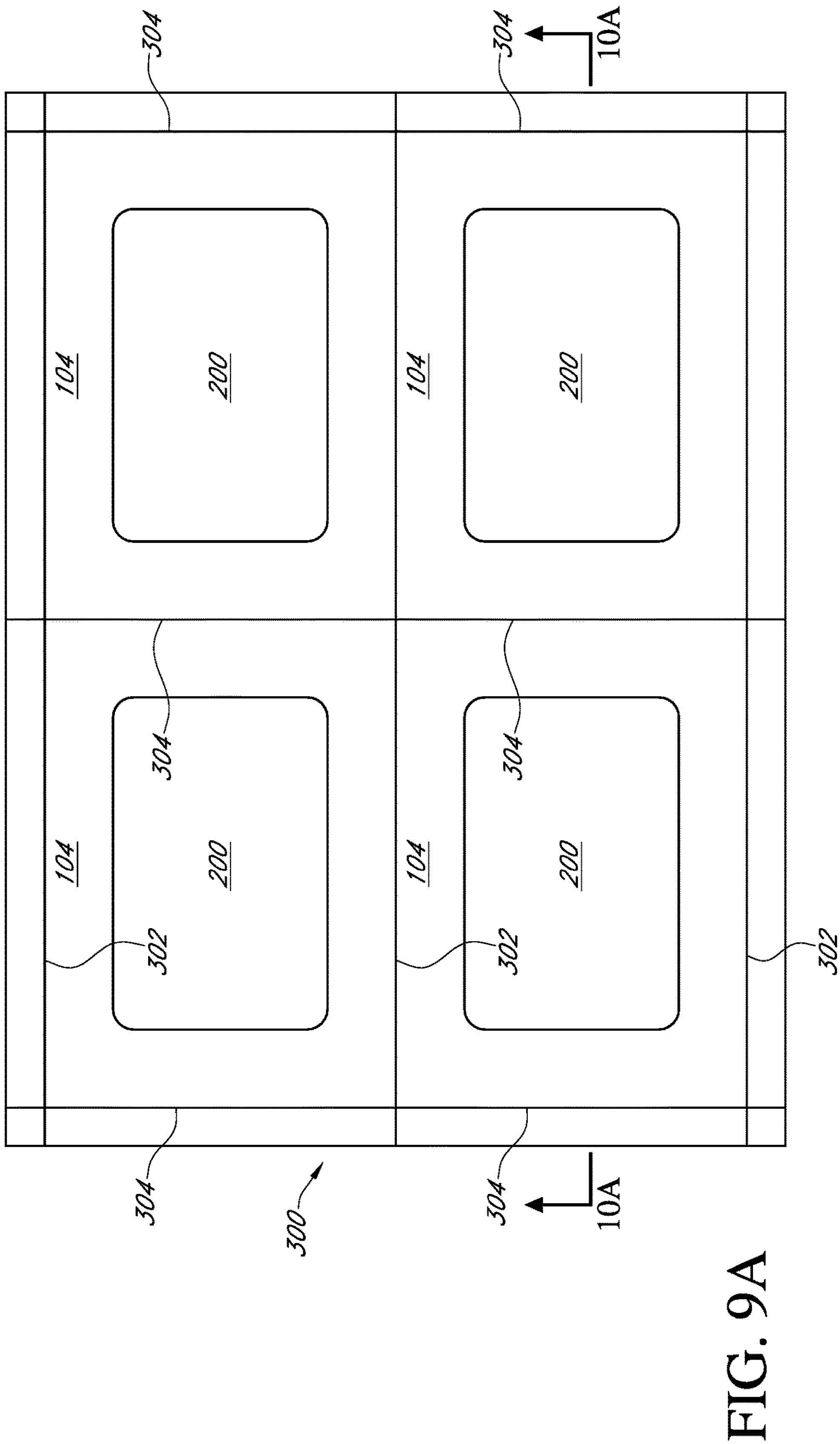
FIGS. 9A-9J show plan views of an array or a group of singulated units in various stages of a process that can be utilized to fabricate a plurality of GDT devices.
Figure 10A:
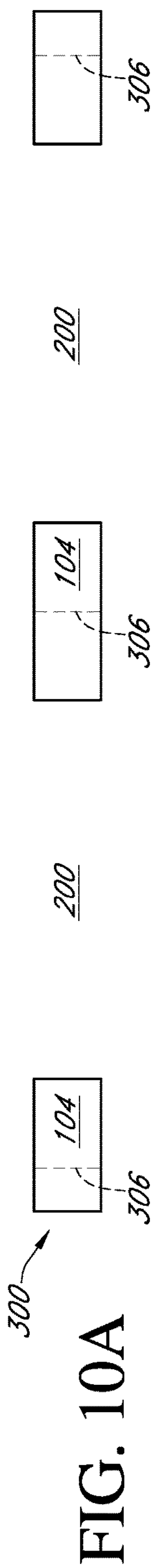
FIGS. 10A-10J show side sectional views of the various stages of FIGS. 9A-9J.

FIG. 9A shows a plan view, and FIG. 10A shows a side sectional view, of an electrically insulating spacer plate 300 (e.g., ceramic spacer) having a plurality of unsingulated spacer units 104. Each of such spacer units, when singulated, is similar to the spacer 104 of FIG. 8A. In FIG. 9A, each spacer unit 104 is shown to include an opening 200. In some embodiments, such an opening can be formed for subsequent steps, or can be pre-formed. For the purpose of description of FIGS. 9A-9J and 10A-10J, the electrically insulating spacer plate 300 can be a ceramic spacer plate; however, it will be understood that such an electrically insulating spacer plate can include other material(s).

In FIG. 10A, the ceramic plate 300 is depicted with boundaries 306 that will become edges of singulated units. In some embodiments, singulations at or near such boundaries can be facilitated by singulating features 302, 304 (e.g., score lines) shown in FIG. 9A. Such singulating features can be formed for subsequent steps, be pre-formed, or some combination thereof. In some embodiments, such singulating features can be formed on the ceramic plate 300 with one or more laser beams.

Figure 9B:
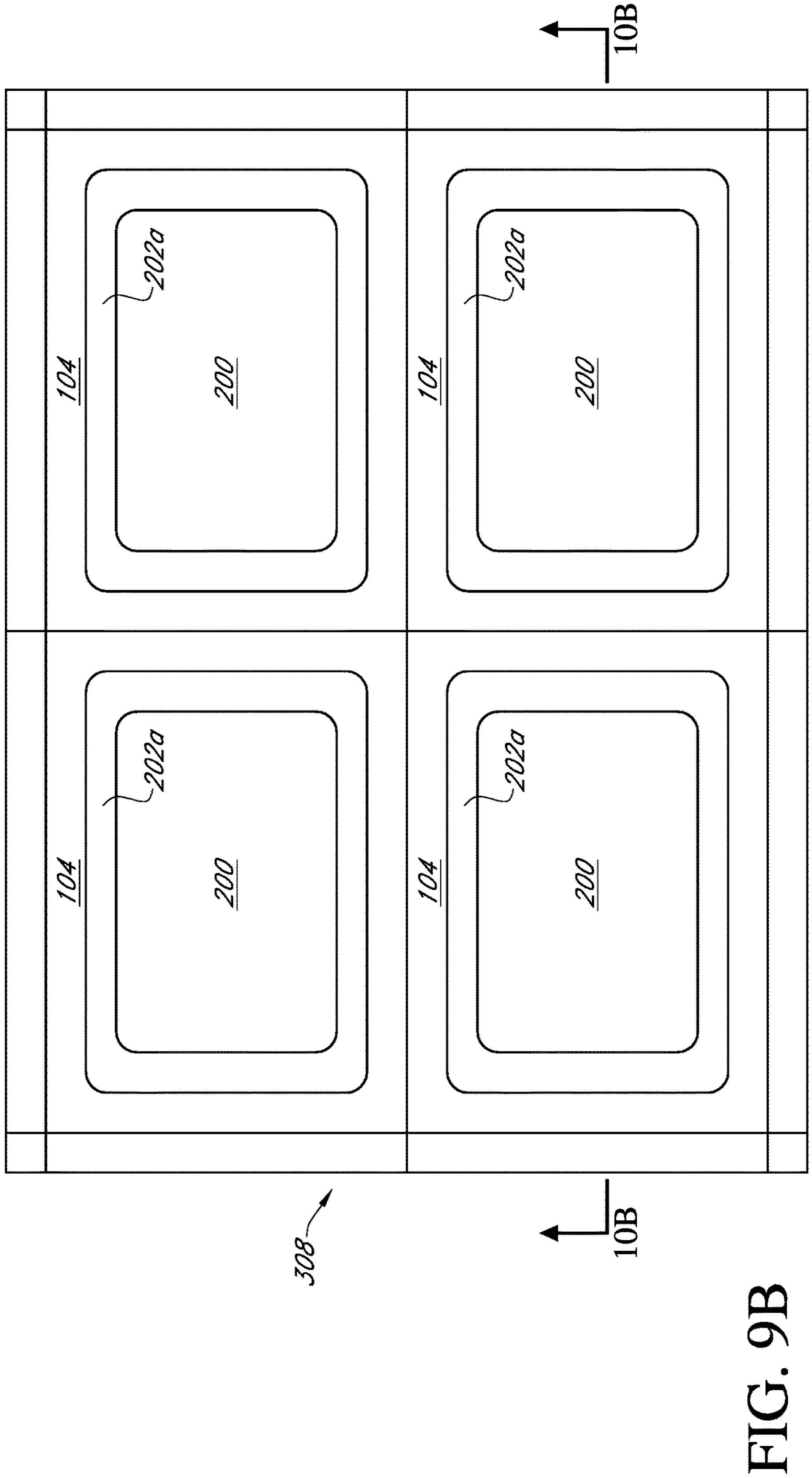
Figure 10B:
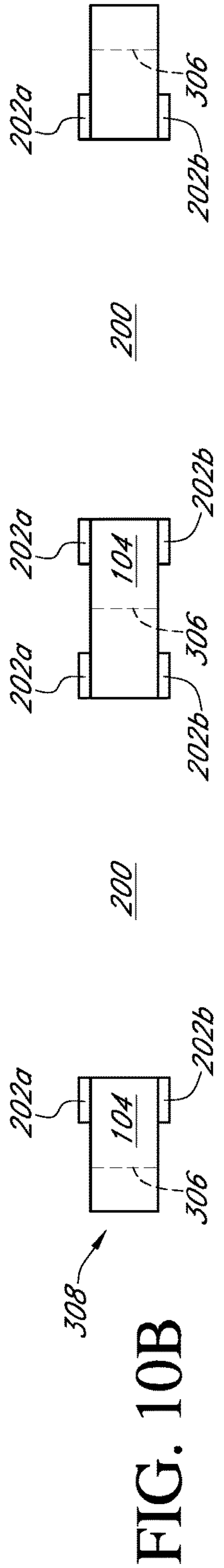

FIGS. 9B and 10B show a step where a glass layer 202*a* is formed for each spacer unit 104, on one side of the ceramic spacer plate, and a glass layer 202*b* is formed for each spacer unit 104, on the other side of the ceramic spacer plate, so as to yield an assembly 308. Examples related to formation of such glass layers can be found in the above-mentioned U.S. Publication No. 2019/0074162. It will be understood that the layers 202*a*, 202*b* can be formed with other materials, including non-glass insulating material(s).

Figure 9C:
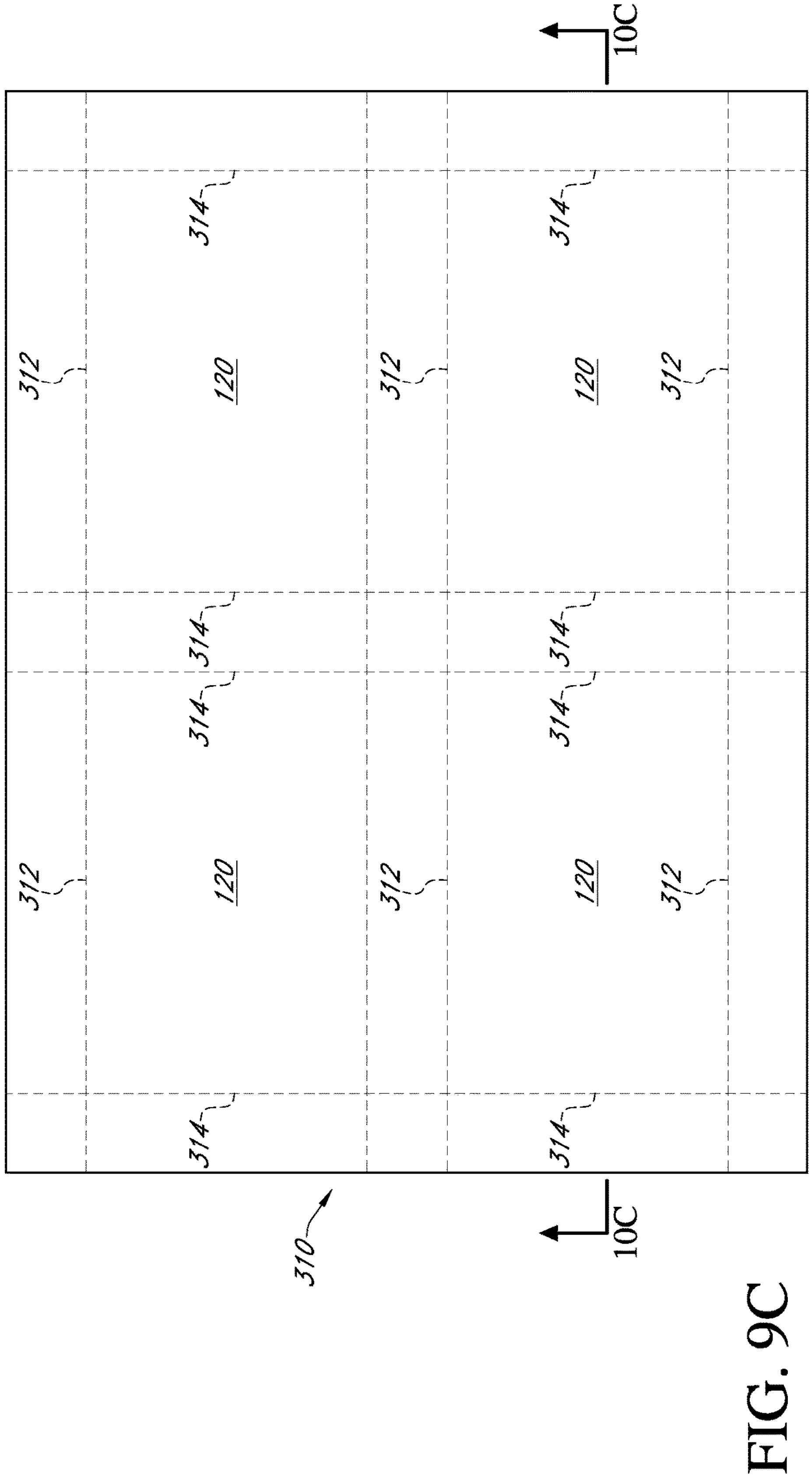
Figure 10C:
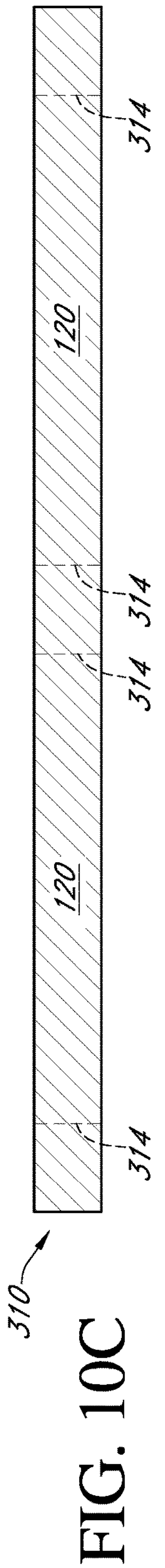

FIG. 9C shows a plan view, and FIG. 10C shows a side sectional view, of a metal sheet 310 having a plurality of unsingulated units 120. Each of such units is similar to the metal sheet 120 of FIG. 8C, and can be utilized as an electrode.

In FIGS. 9C and 10C, the metal sheet 310 is depicted with boundaries 312, 314 that will become edges of singulated units 120. In some embodiments, the metal sheet 310 can be stamp-cut to provide a plurality of singulated units 120.

Figure 9D:
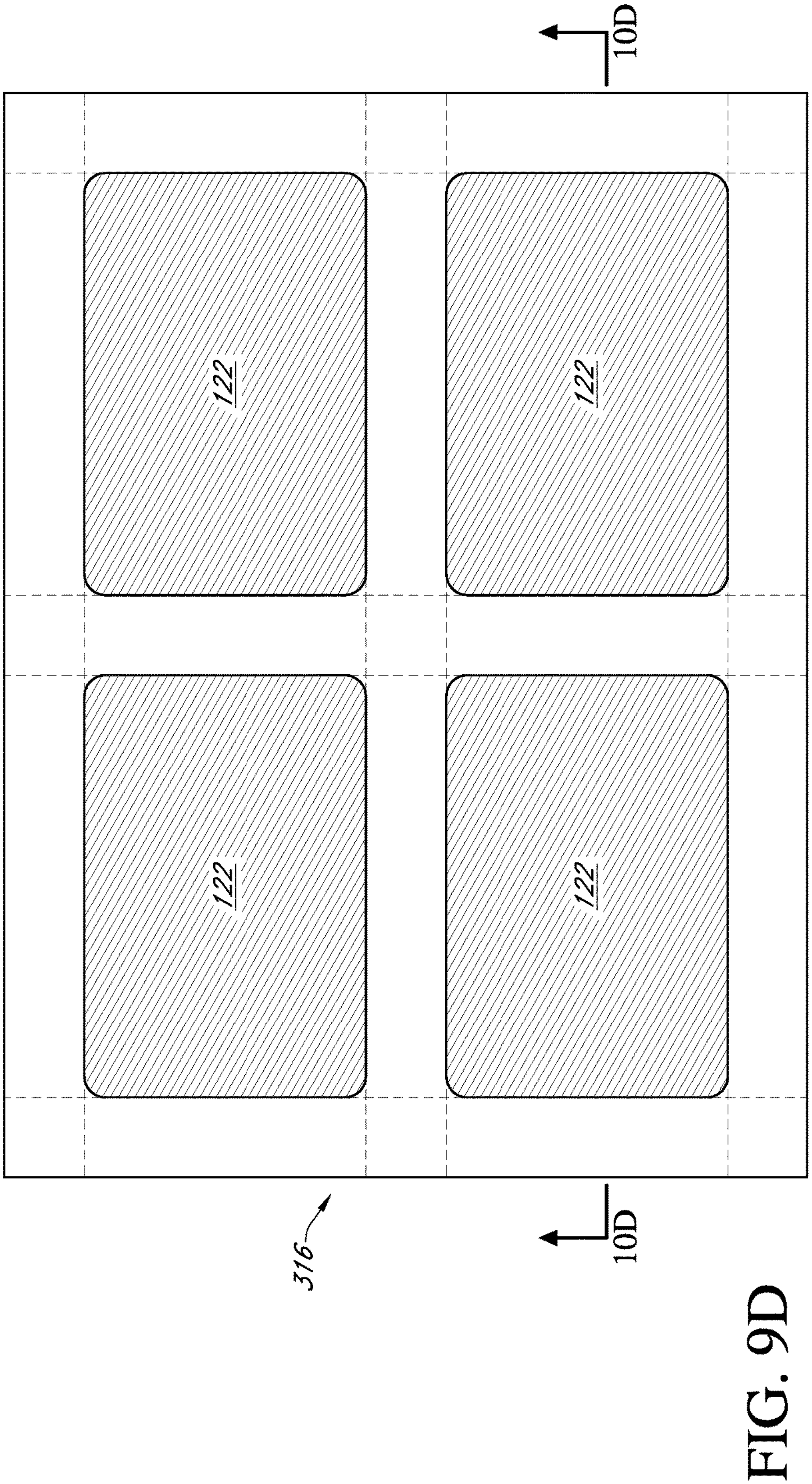
Figure 10D:
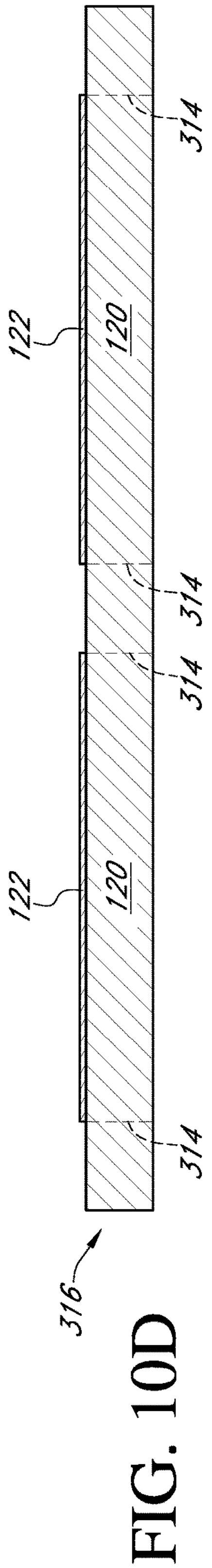

FIGS. 9D and 10D show a step where a silver ink layer 122 is formed for each unit 120 on one side of the metal sheet 310, so as to yield an assembly 316. In some embodiments, such a silver ink layer can be formed by, for example, printing or spraying followed by a curing step. In some embodiments, and as described herein in reference to FIG. 5, this step can be omitted in a configuration where electrodes are implemented as stamped metal structures.

Figure 9E:
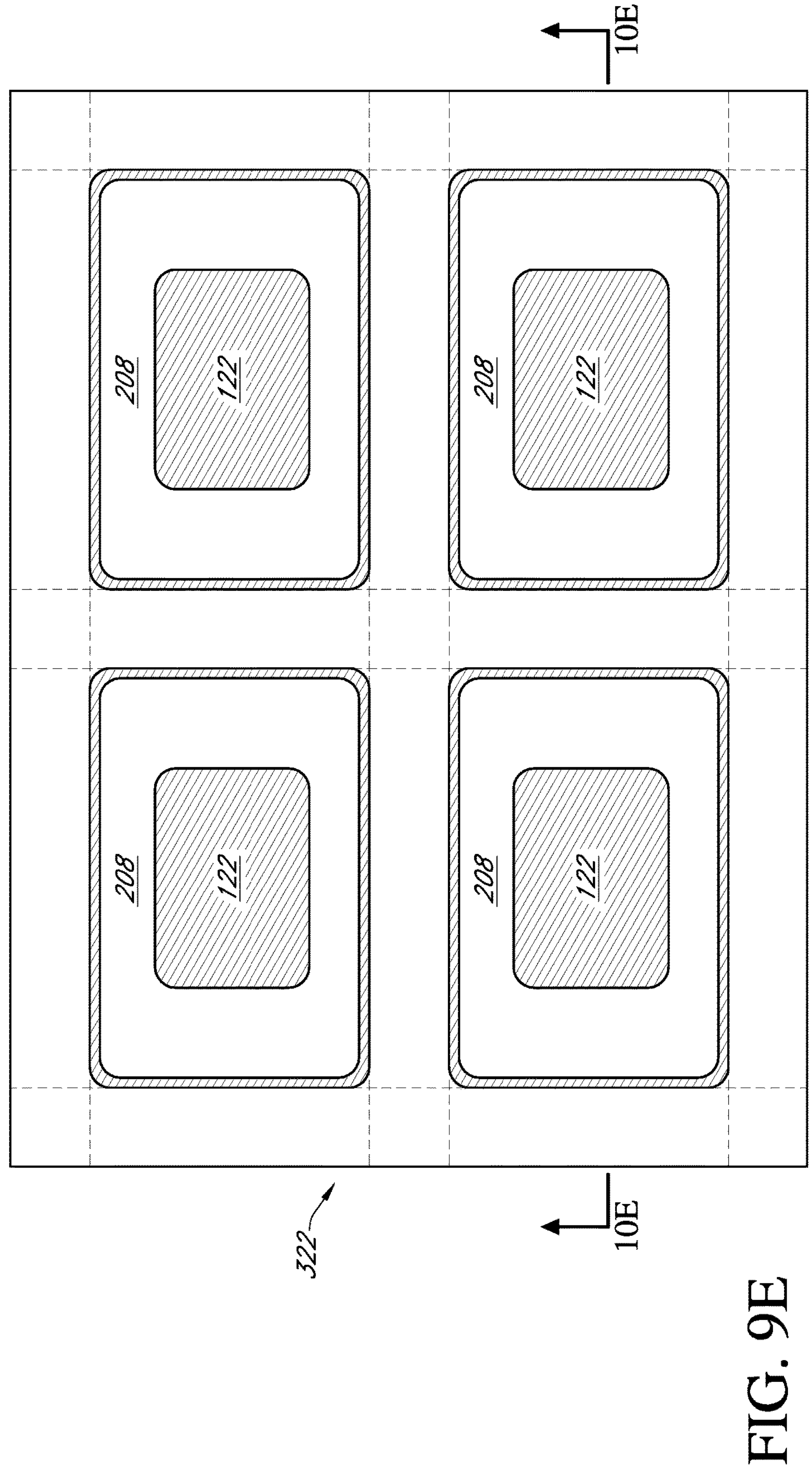
Figure 10E:
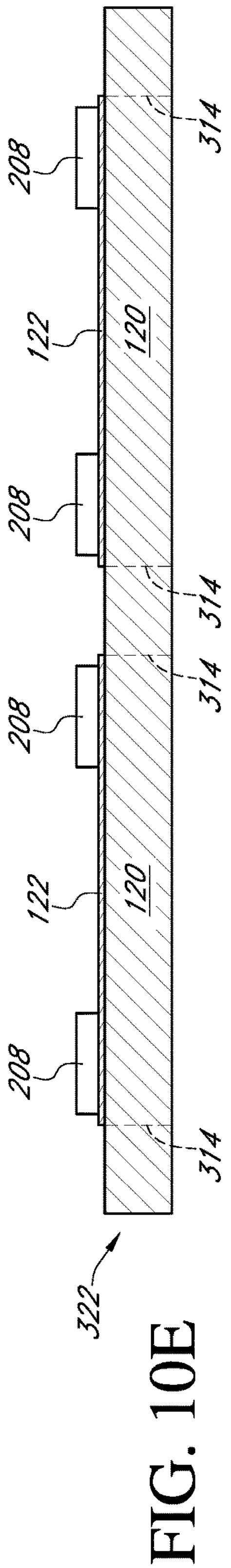

FIGS. 9E and 10E show a step where a glass layer 208 is formed for each unit 120 on the silver ink layer 122, so as to yield an assembly 322. In some embodiments, such a glass layer can be formed around the periphery of the silver ink layer 122 with a width dimension to provide an increase in leakage path length as described herein. In some embodiments, and as described herein in reference to FIG. 5, the glass layer 208 can be formed around the periphery of each unit 120 (e.g., directly on the metal) in a configuration where electrodes are implemented as stamped metal structures.

Figure 9F:
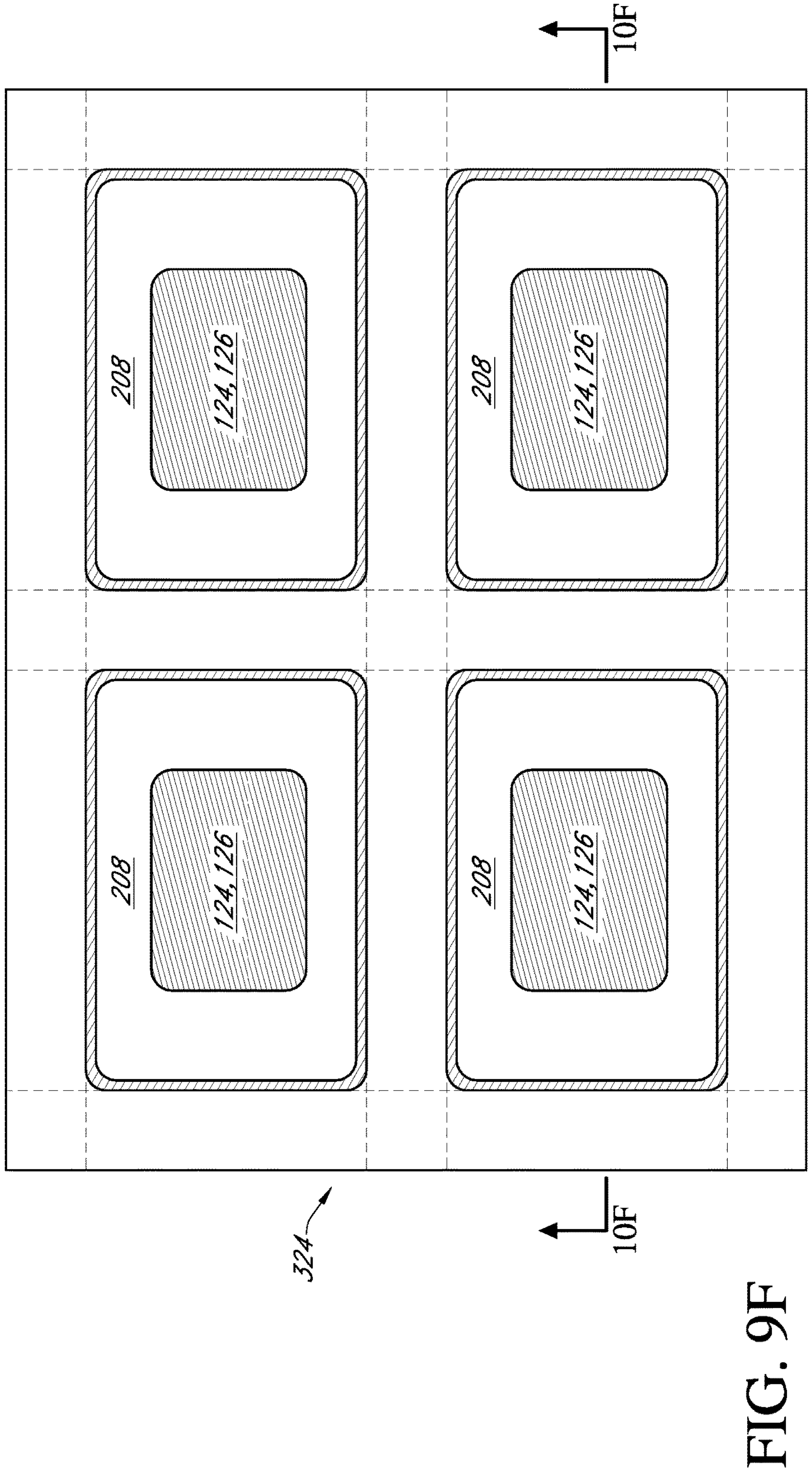
Figure 10F:
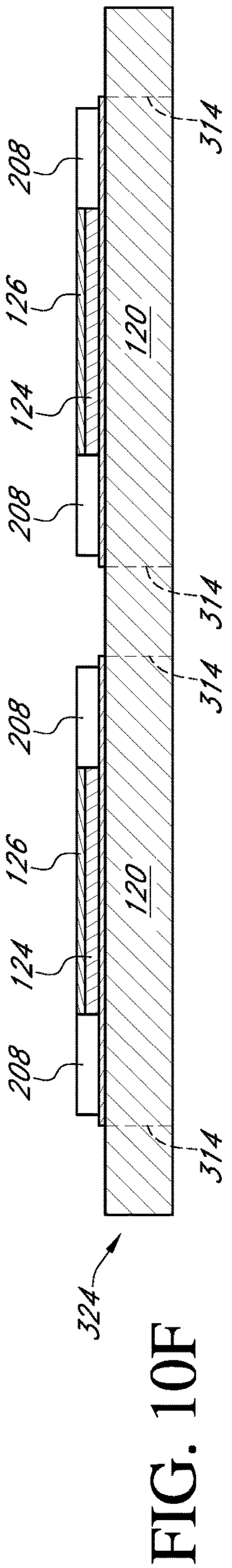

FIGS. 9F and 10F show a step where a silver texture layer 124 and an emissive coating layer 126 are formed for each unit 120 on the silver ink layer 122 so as to be laterally between the glass layer 208 along the periphery, so as to yield an assembly 324. In some embodiments, and as described herein in reference to FIG. 5, the silver texture layer 124 can be omitted; instead, similar texture features can be formed on the metal of each unit 120 (e.g., stamped features) in a configuration where electrodes are implemented as stamped metal structures.

Figure 9G:
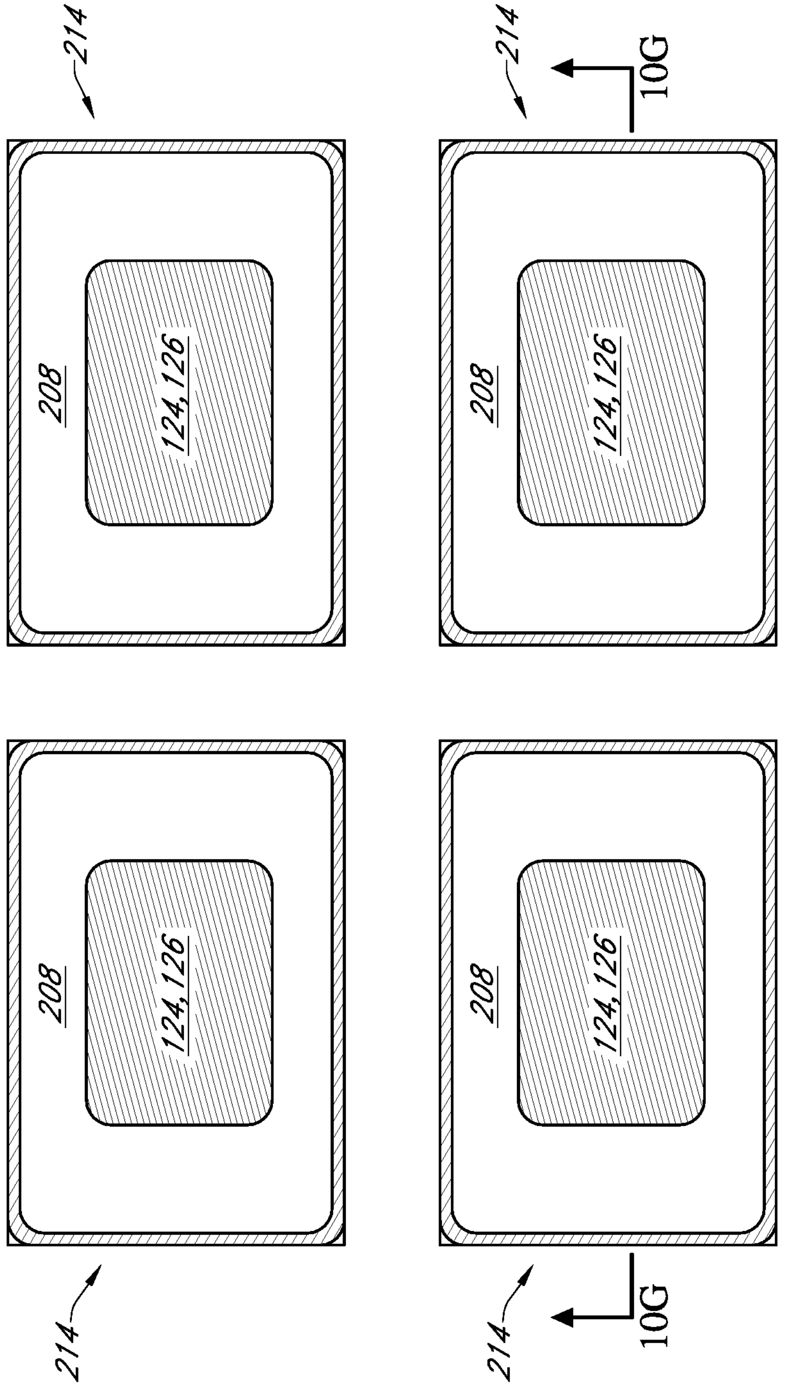
Figure 10G:
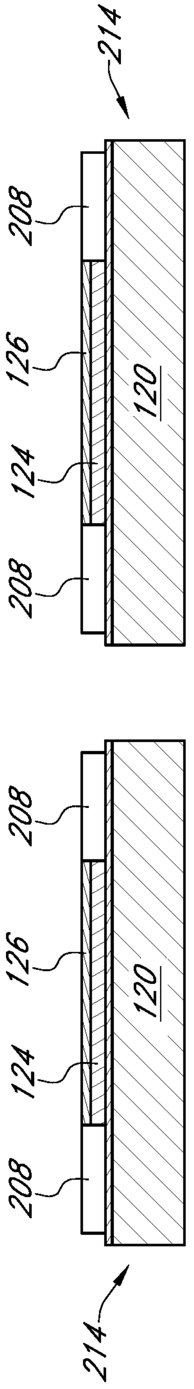

FIGS. 9G and 10G show a step where the assembly 324 of FIGS. 9F and 10F is singulated along the boundaries 312, 314 to provide a plurality of singulated units 214. Each of the singulated units 214 can be utilized as either of the first and second electrodes 102*a*, 102*b* of the example of FIG. 5.

Figure 9H:
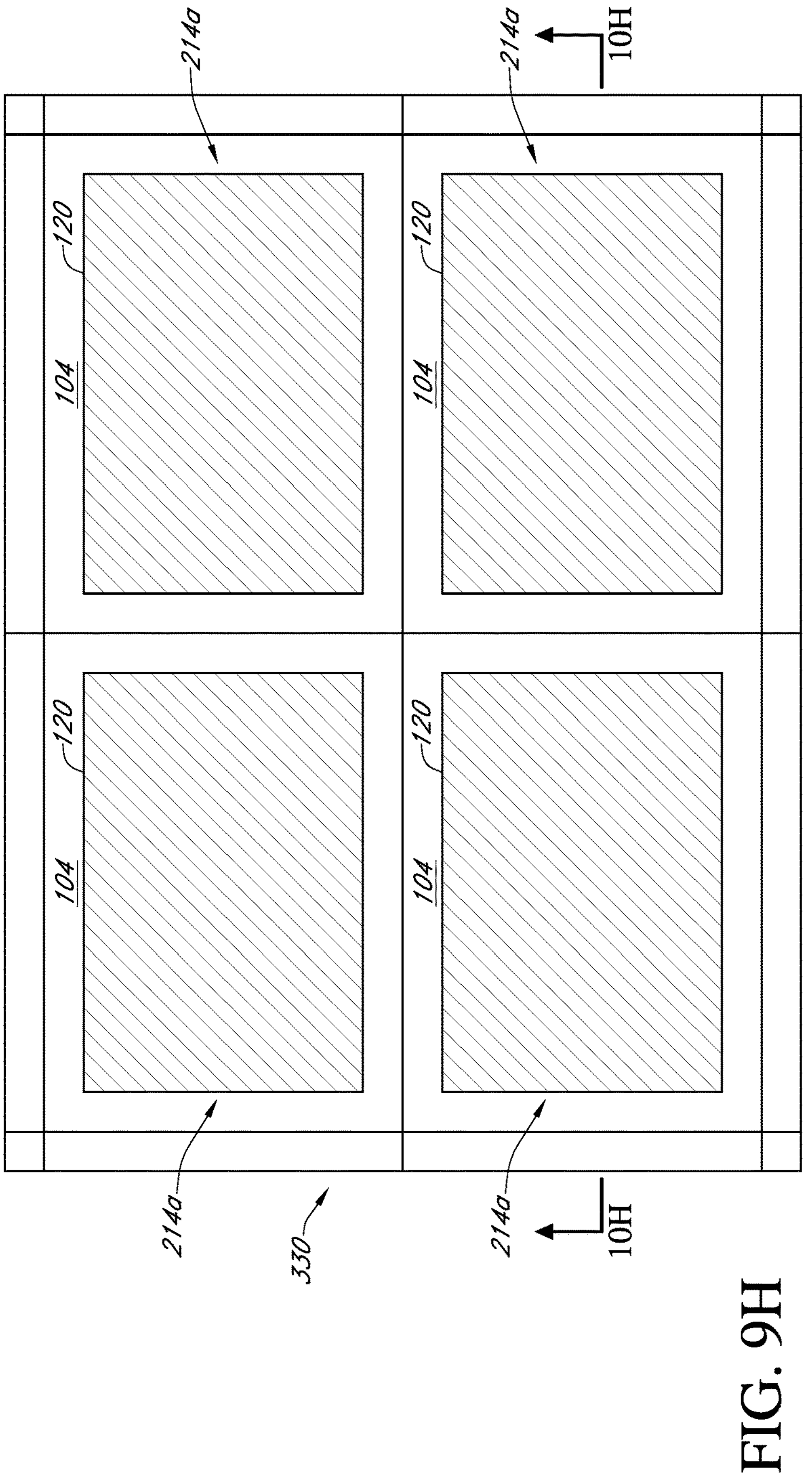
Figure 10H:
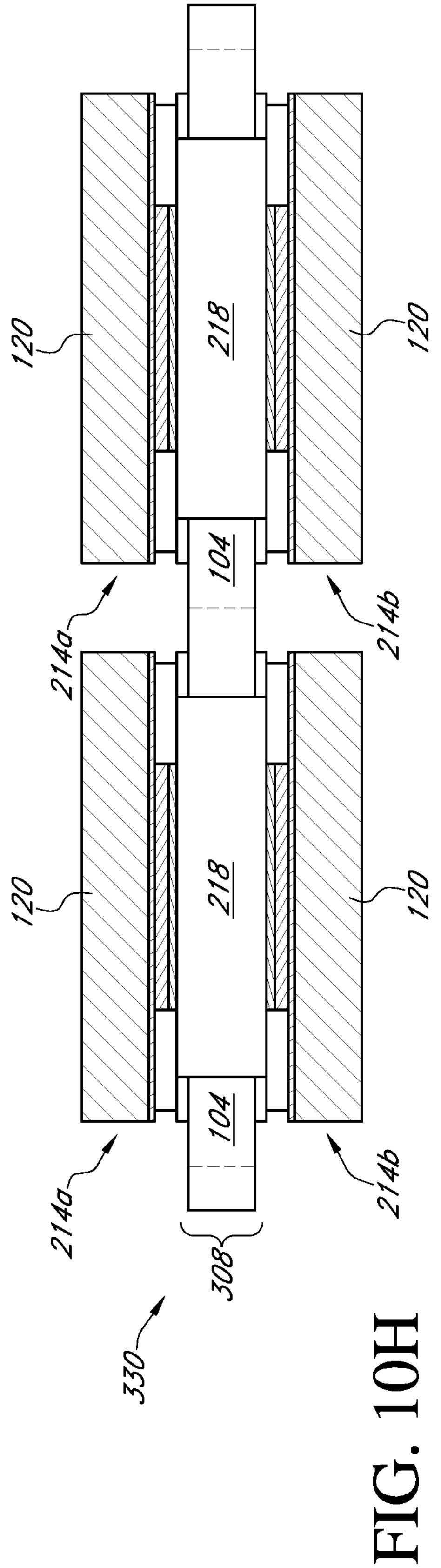

FIGS. 9H and 10H show an assembly view where each unit 104 of the assembly 308 of FIGS. 9B and 10B is sandwiched between two singulated units 214*a*, 214*b* of FIGS. 9G and 10G, so as to yield an assembly 330. It will be understood that in some embodiments, the singulated units 214*a*, 214*b* can be mated with the respective unit 104 at the same time, mated with the unit 104 in sequence, or some combination thereof.

In the example of FIGS. 9H and 10H, the mating interfaces are yet to be cured and sealed. During or before the sealing process, desired gas can be introduced to a volume 218 associated with each unit 104.

Figure 9I:
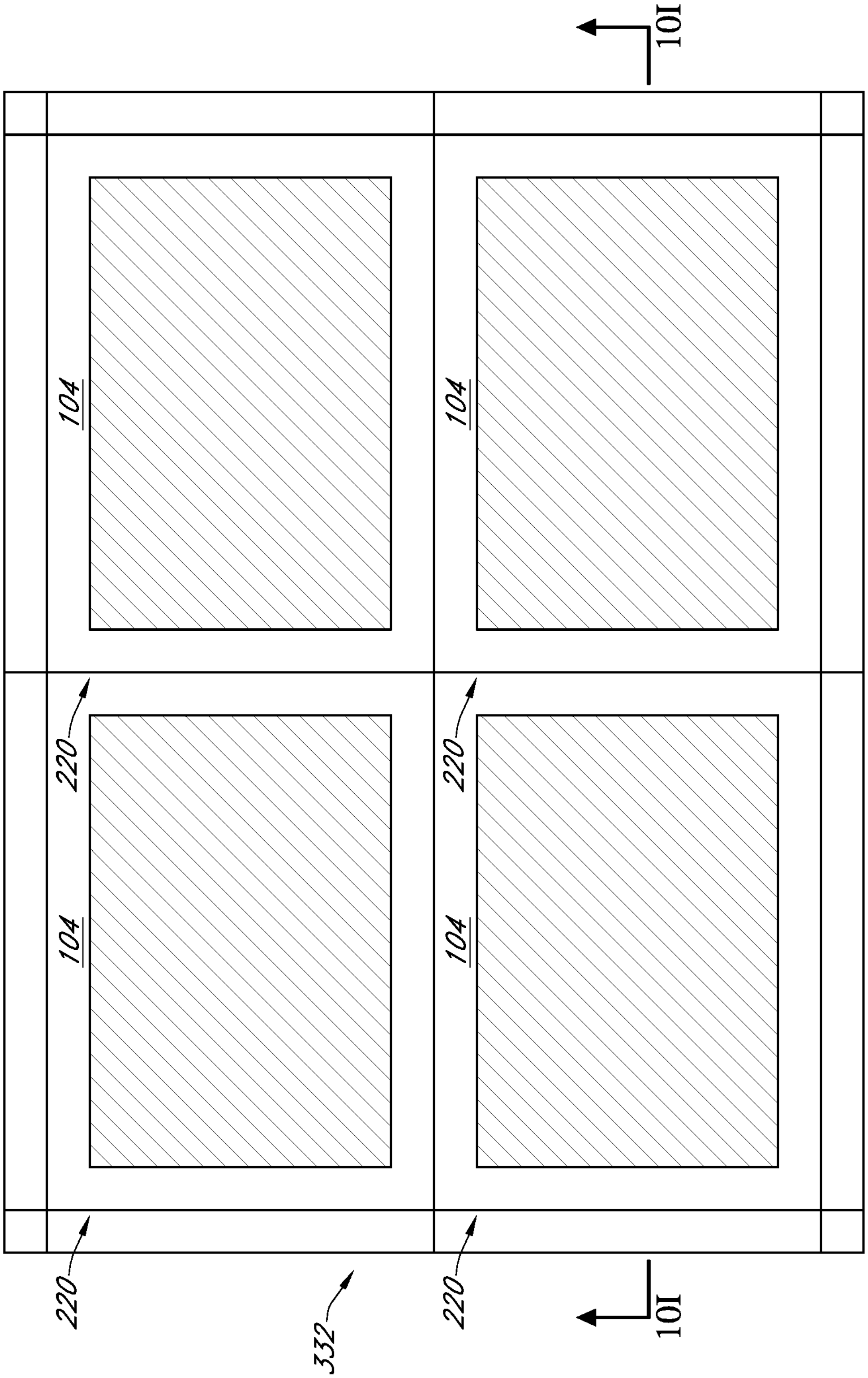
Figure 10I:
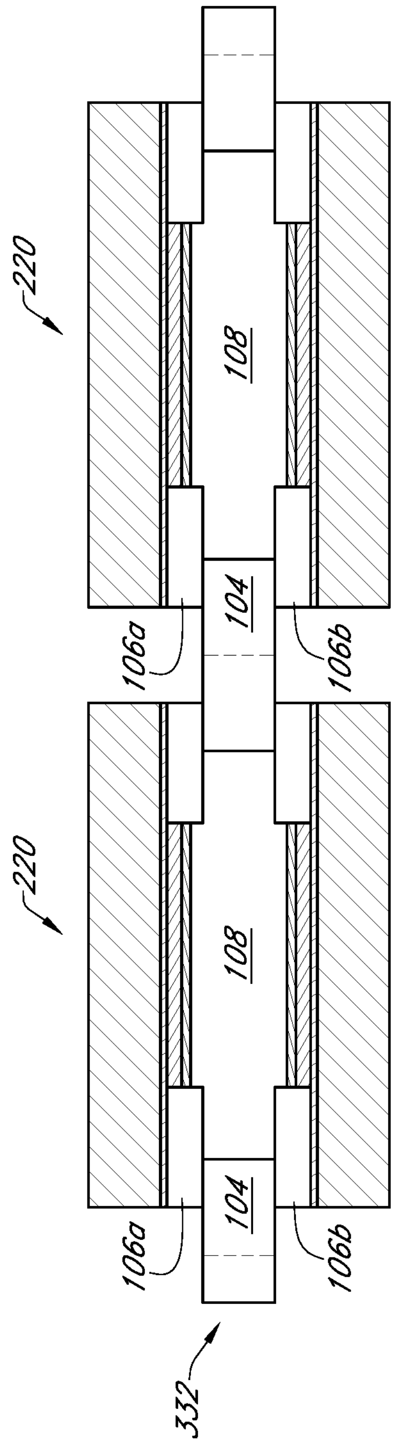

FIGS. 9I and 10I show an assembly view where the mating interfaces are cured so as to yield a plurality of unsingulated GDT units 220, so as to yield an assembly 332. Each of such unsingulated GDT units is shown to include a sealed chamber 108 and an increased leakage path length that includes a portion of each of the insulator seals 106*a*, 106*b*, as described herein.

Figure 9J:
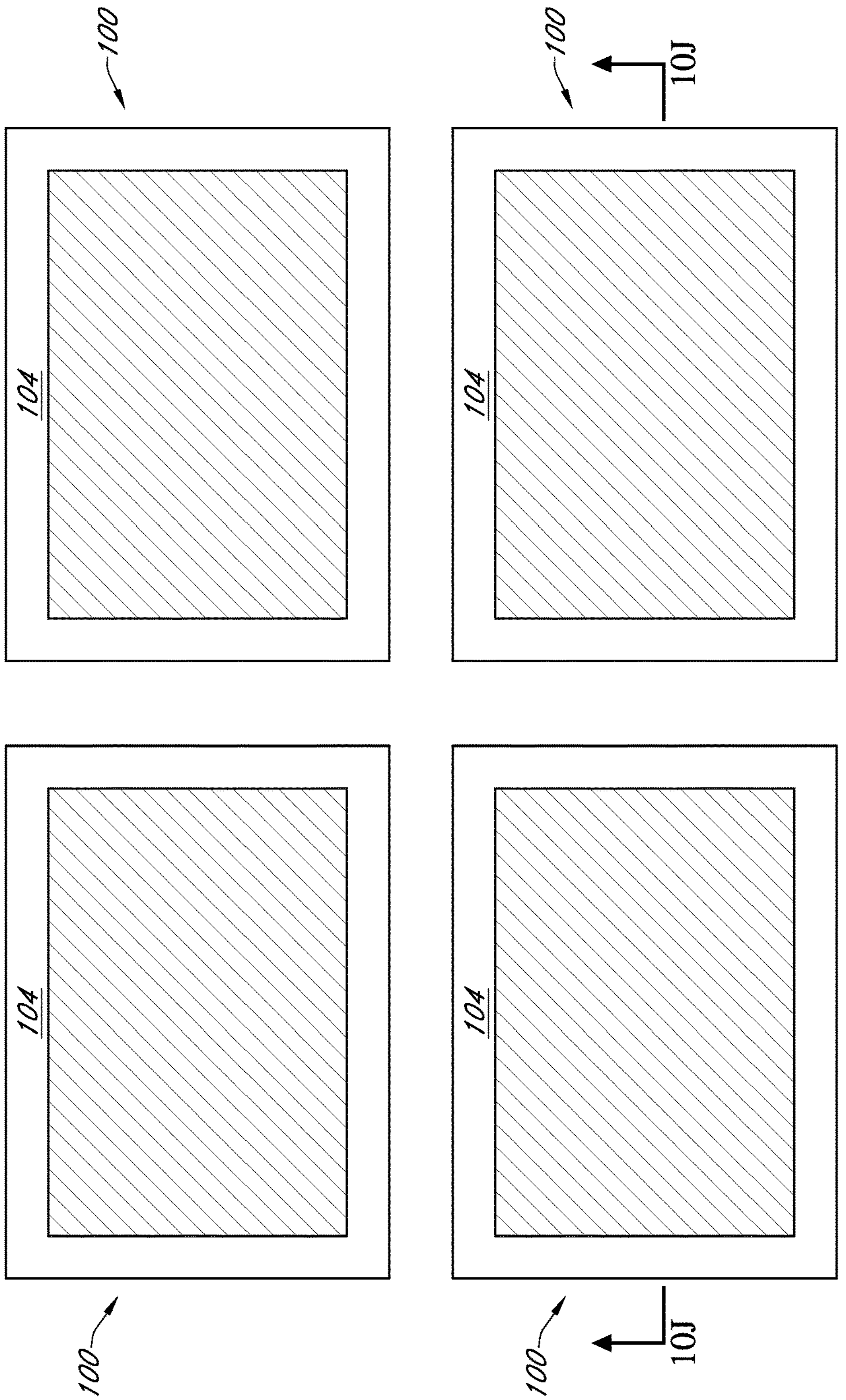
Figure 10J:
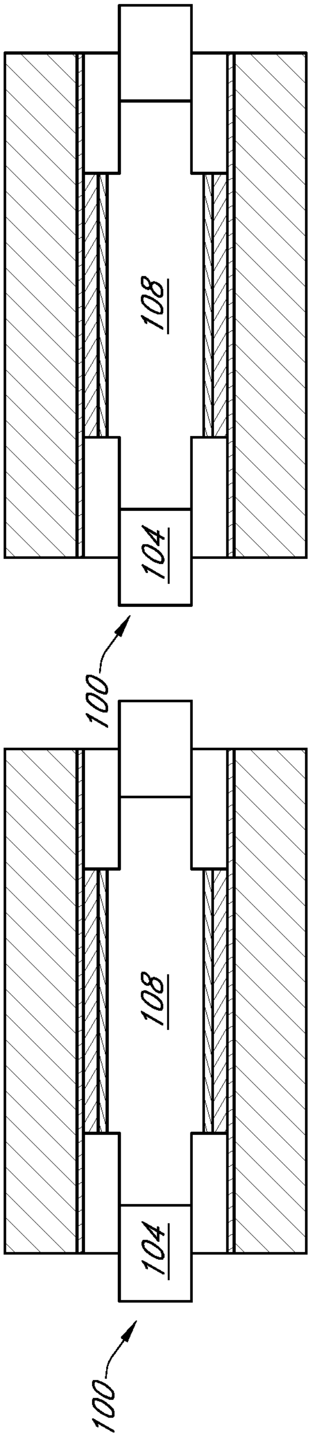

FIGS. 9J and 10J show a step where the assembly 332 of FIGS. 9I and 10I is singulated along the boundaries (312, 314 in FIG. 9A) to provide a plurality of singulated GDTs 100. Each of the singulated GDTs 100 can be similar to the example of FIG. 5.

In the examples of FIGS. 9A-9J and 10A-10J, lateral shape of GDTs are depicted as being a rectangle. Such a shape can allow singulation of processed units by, for example, snapping facilitated by score lines on the corresponding spacer plate. Such GDTs are also depicted as having rectangular shaped chambers and related electrodes. Accordingly, in such a configuration, the electrically insulating layer for providing increased leakage path length associated with each electrode can have a rectangular shaped ring that surrounds the corresponding discharging portion of the electrode. It will be understood that a GDT having one or more features as described herein can include other lateral shapes, including a circular shape. It will also be understood that different parts of a GDT having one or more features as described herein can have different lateral shapes. For example, a spacer can have a rectangular shape, and its opening can have a circular shape. For such a configuration, corresponding electrodes and related parts such as insulator seals can have circular shapes.

In the various examples described herein in reference to FIGS. 2-10, a spacer is utilized between a pair of opposing electrodes, with a thickness of the spacer being part of a leakage path length. Such a leakage path length is shown to be increased by implementation of an electrically insulating layer to laterally surround a discharging portion of a respective electrode, to thereby provide an increase in leakage path length representative of a dimension between an edge of the discharging portion and an inner wall of the opening of the spacer. As described herein, such an electrically insulating layer can be configured to also provide a sealing functionality (e.g., as in the example of FIG. 5), or be configured mainly to provide the separation between the discharging portion and the inner wall of the spacer.

Accordingly, one can see that a GDT having one or more features as described herein can have an increased leakage path length with or without a spacer between a pair of opposing electrodes. For example, FIGS. 11-13 show various examples of GDTs each having a sealed chamber formed by a pair of opposing electrode joined and sealed together by a sealing structure without use of a separate spacer. It is noted that in some embodiments, such GDT configurations may be desirable with or without an increased leakage path length.

Figure 11A:
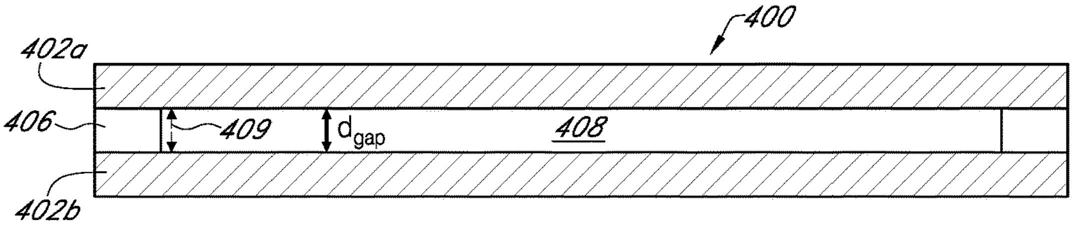
FIG. 11A shows an example GDT where an electrically insulating seal can join first and second electrodes to provide a sealed chamber without a separate spacer.

FIG. 11A shows that in some embodiments, a GDT 400 can include first and second electrodes 402*a*, 402*b* having flat surfaces facing each other and separated by a gap dimension $d_{gap}$. Such first and second electrodes can be implemented as, for example flat metal sheets. In the example of FIG. 11A, an electrically insulating seal structure 406 (e.g., glass seal) is shown to join and seal the outer periphery of the electrodes 402*a*, 402*b* so as to form a sealed chamber 408. Accordingly, a leakage path 409 between the first and second electrodes 402*a*, 402*b* is essentially a dimension of a wall of the sealed chamber 408 defined by the insulating seal structure 406.

Figure 11B:
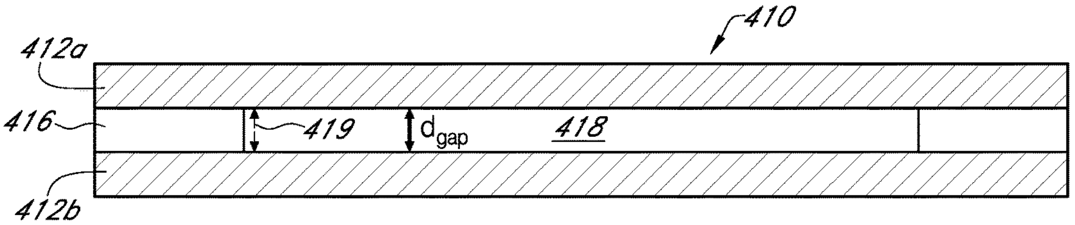
FIG. 11B shows another example GDT where an electrically insulating seal can join first and second electrodes to provide a sealed chamber without a separate spacer.

Similarly, FIG. 11B shows that in some embodiments, a GDT 410 can include first and second electrodes 412*a*, 412*b* having flat surfaces facing each other and separated by a gap dimension $d_{gap}$. Such first and second electrodes can be implemented as, for example flat metal sheets. In the example of FIG. 11B, an electrically insulating seal structure 416 (e.g., glass seal) is shown to join and seal the outer periphery of the electrodes 412*a*, 412*b* so as to form a sealed chamber 418. Accordingly, a leakage path 419 between the first and second electrodes 412*a*, 412*b* is essentially a dimension of a wall of the sealed chamber 418 defined by the insulating seal structure 416. In the example of FIG. 11B, the insulating seal structure 416 is shown to have a lateral dimension that is significantly larger than lateral dimension of the insulating seal structure 406 of the example of FIG. 11A.

Referring to the examples of FIGS. 11A and 11B, and assuming that the respective gap dimensions ($d_{gap}$) are similar, one can see that the increased lateral dimension of the insulating seal structure alone does not provide an increase in leakage path length relative to a gap dimension ($d_{gap}$). More particularly, in the examples of FIGS. 11A and 11B, the GDTs have essentially the same ratio of leakage path length (approximately same as the wall height) to the gap dimension ($d_{gap}$).

Figure 12A:
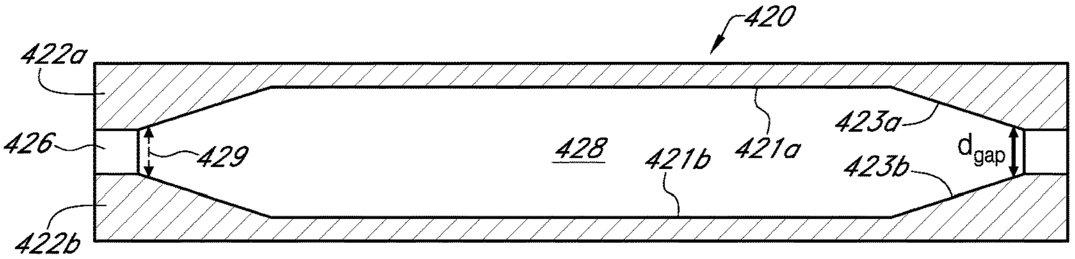
FIG. 12A shows an example GDT where an electrically insulating seal can join first and second electrodes having inward facing surfaces, to provide a chamber without a separate spacer.
Figure 13:
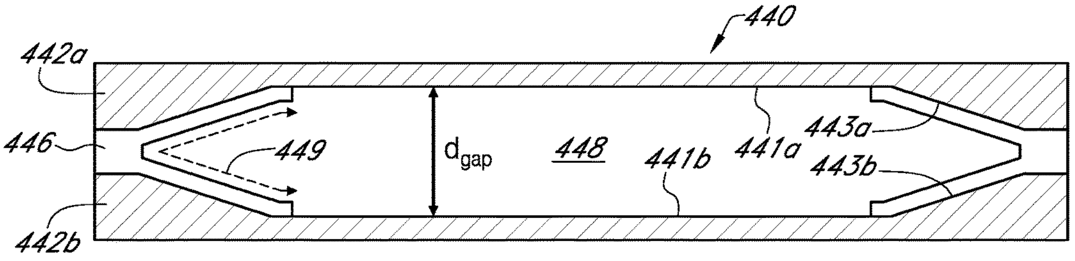
FIG. 13 shows an example GDT having first and second electrodes similar to the examples of FIGS. 12A and 12B, but including an electrically insulating seal configured to provide an increase in leakage path length.

FIG. 12A shows that in some embodiments, a GDT 420 can include first and second electrodes 422*a*, 422*b* having contoured surfaces (e.g., concave surfaces) facing each other and a closest separation gap dimension $d_{gap}$. In the example of FIG. 12A, an electrically insulating seal structure 426 (e.g., glass seal) is shown to join and seal the outer periphery of the electrodes 422*a*, 422*b* so as to form a sealed chamber 428. Accordingly, a leakage path 429 between the first and second electrodes 422*a*, 422*b* is essentially a dimension of a wall of the sealed chamber 428 defined by the insulating seal structure 426.

Figure 12B:
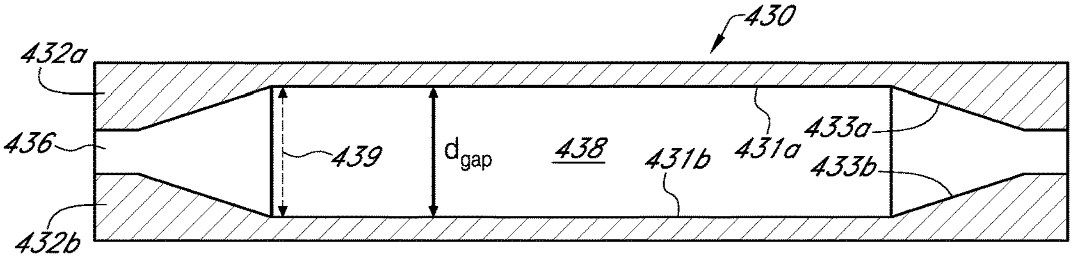
FIG. 12B shows another example GDT where an electrically insulating seal can join first and second electrodes having inward facing surfaces, to provide a chamber without a separate spacer.

Similarly, FIG. 12B shows that in some embodiments, a GDT 430 can include first and second electrodes 432*a*, 432*b* having contoured surfaces (e.g., concave surfaces) facing each other and a closest separation gap dimension $d_{gap}$. In the example of FIG. 12B, an electrically insulating seal structure 436 (e.g., glass seal) is shown to join and seal the outer periphery of the electrodes 432*a*, 432*b* so as to form a sealed chamber 438. Accordingly, a leakage path 439 between the first and second electrodes 432*a*, 432*b* is essentially a dimension of a wall of the sealed chamber 438 defined by the insulating seal structure 436. In the example of FIG. 12B, the insulating seal structure 436 is shown to have a lateral dimension that is significantly larger than lateral dimension of the insulating seal structure 426 of the example of FIG. 12A.

Referring to the examples of FIGS. 12A and 12B, and assuming that the concave surfaces of the respective GDTs are dimensioned similarly, one can see that the increased lateral dimension of the insulating seal structure 436 of FIG. 12B results in the wall dimension of the chamber 438 (defined by the insulating seal structure 436), and thus the leakage path length, being significantly greater than the wall dimension/leakage path length of the GDT of FIG. 12A. However, in the example of FIG. 12B, the closest separation gap dimension $d_{gap}$ is also increased significantly when compared to the closest separation gap dimension $d_{gap}$ in the example of FIG. 12A. Thus, one can see that the increased dimension of the insulating seal structure alone does not necessarily provide an increase in leakage path length relative to a gap dimension ($d_{gap}$). More particularly, in the examples of FIGS. 12A and 12B, the GDTs have similar ratios of respective leakage path lengths to gap dimensions ($d_{gap}$).

FIG. 13 shows a GDT 440 having a similar electrode arrangement as in the examples of FIGS. 12A and 12B. In the example of FIG. 13, an electrically insulating seal structure 446 (e.g., glass seal) is shown to join and seal the outer periphery of first and second electrodes 442*a*, 442*b* so as to form a sealed chamber 448. The electrically insulating seal structure 446 is shown to further include a separate covering portion for each of the first and second electrodes 442*a*, 442*b*. More particularly, a first covering portion is shown to extend from the sealing portion of the electrically insulating seal structure 446 to cover at least a portion of the concave profile of the inward facing surface of the first electrode 442*a*. Similarly, a second covering portion is shown to extend from the sealing portion of the electrically insulating seal structure 446 to cover at least a portion of the concave profile of the inward facing surface of the second electrode 442*b*. Accordingly, a leakage path 449 between the first and second electrodes 442*a*, 442*b* is shown to include an extension length of each of the first and second covering portions of the electrically insulating seal structure 446, instead of essentially being similar to a dimension of a straight wall of the sealed chamber as in the example of FIG. 12B.

In the example of FIG. 13, each concave surface of the respective electrode is shown to include an inner portion (441*a* or 441*b*) and an outer portion (443*a* or 443*b*). Such inner and outer portions can have straight profiles as shown in FIG. 13; however, it will be understood that in some embodiments, either or both of the inner and outer portions can have curved profile(s).

In the example of FIG. 13, each covering portion of the electrically insulating seal structure 446 is shown to extend inward to cover the entire outer portion (443*a* or 443*b*) and a portion of the inner portion (441*a* or 441*b*) so as to provide the example leakage path 449, and to have the ends of the covering portions define the gap dimension $d_{gap}$. It is noted that if each covering portion is dimensioned to cover only a portion of the respective outer portion (443*a* or 443*b*), then the resulting gap dimension $d_{gap}$ can be a separation distance between the two electrodes 442*a*, 442*b* at the ends of the covering portions. In such a configuration, the resulting ratio of leakage path length to gap dimension may or may not be sufficient for a desired GDT design.

Accordingly, in some embodiments, an electrically insulating seal structure can include a separate covering portion that extends by a selected distance along the concave surface of the respective electrode, to provide a desired ratio of leakage path length to gap dimension. In some embodiments, each covering portion of the electrically insulating seal structure can extend partially along the respective outer portion (443*a* or 443*b*) of the concave surface and thereby leave the entire inner portion (441*a* or 441*b*) uncovered. In some embodiments, each covering portion of the electrically insulating seal structure can extend to substantially cover the respective outer portion (443*a* or 443*b*) of the concave surface and leave the inner portion (441*a* or 441*b*) substantially uncovered. In some embodiments, each covering portion of the electrically insulating seal structure can extend to cover the respective outer portion (443*a* or 443*b*) of the concave surface as well as a portion of the inner portion (441*a* or 441*b*) thereby leaving the remainder of the inner portion uncovered.

Based at least on the various examples provided herein, in some embodiments, a gas discharge tube (GDT) can include first and second electrodes with each including an inward facing surface, such that the inward facing surfaces of the first and second electrodes face each other. The GDT can further include a sealing portion implemented to join and seal edge portions of the inward facing surfaces of the first and second electrodes to define a sealed chamber between the inward facing surfaces of the first and second electrodes. The GDT can further include an electrically insulating layer implemented to cover a portion of the inward facing surface of each of at least one of the first and second electrodes to define a discharging portion on the respective inward facing surface not covered by the electrically insulating layer, such that the sealed chamber is further defined by a surface of the electrically insulating layer and the discharging portion of the respective electrode, and such that a leakage path within the sealed chamber includes the surface of the electrically insulating layer and the wall of the sealed chamber.

It is noted that in the various examples described herein, the foregoing sealing portion of the GDT includes a sealing member, and may or may not include a spacer. For example, each of the GDTs shown in FIGS. 2-7 includes one or more spacers. For such a configuration, the foregoing wall of the sealed chamber can include a wall of an opening of each of the one or more spacers. In another example, the GDT shown in FIG. 13 does not include a separate spacer. For such a configuration, the foregoing wall of the sealed chamber can include a portion where the at least one electrically insulating layer joins with the sealing member (e.g., if only one electrically insulating layer is provided) or the other electrically insulating layer (e.g., if electrically insulating layers are provided for both of the inward facing surfaces).

It is also noted that the various examples depicted herein in respective figures, an electrically insulating layer is shown to be provided for each of the first and second electrodes, to thereby increase the respective GDT's internal leakage path length. It will be understood that in some embodiments, a GDT having one or more features as described herein can still have its internal leakage path length increased by only one electrode being provided with an electrically insulating layer.

In some embodiments, a GDT having one or more features as described herein can be utilized by itself as, for example, a circuit protection device. In some embodiment, a GDT having one or more features as described herein can be combined with another device or component.

Figure 14:
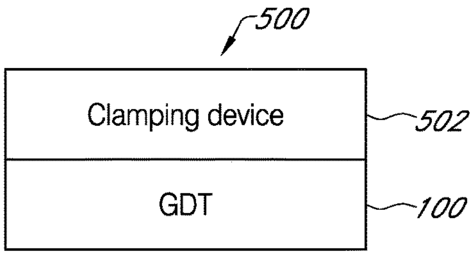
FIG. 14 shows an example of a circuit protection device that includes a GDT having one or more features as described herein combined with a clamping device.
Figure 15:
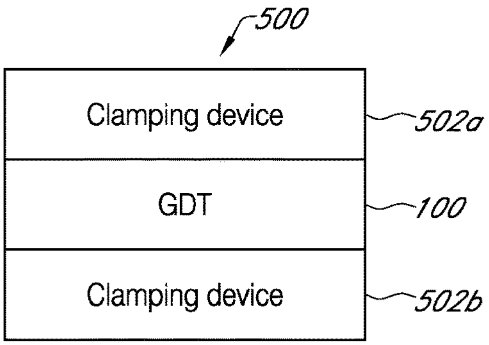
FIG. 15 shows another example of a circuit protection device that includes a GDT having one or more features as described herein combined with a first clamping device on one side, and a second clamping device on the other side.

For example, FIGS. 14 and 15 show that in some embodiments, a GDT having one or more features as described herein can be combined with one or more electrical devices or components to yield a circuit protection device. For example, FIG. 14 shows a circuit protection 500 where a GDT 100 is coupled to a clamping device 502 (e.g., in series). Such coupling of the GDT 100 and the clamping device 502 can be through one or more conductive paths (e.g., wires) or such that the two devices are in physical contact with each other.

In another example, FIG. 15 shows a circuit protection device 500 where a GDT 100 is coupled to a first clamping device 502*a* on one side, and to a second clamping device 502*b* on the other side. In some embodiments, such an arrangement can be in series. In some embodiments, each of such couplings of the GDT 100 and the clamping device 502*a*, 502*b* can be through one or more conductive paths (e.g., wires) or such that the coupled devices are in physical contact with each other.

Figure 16:
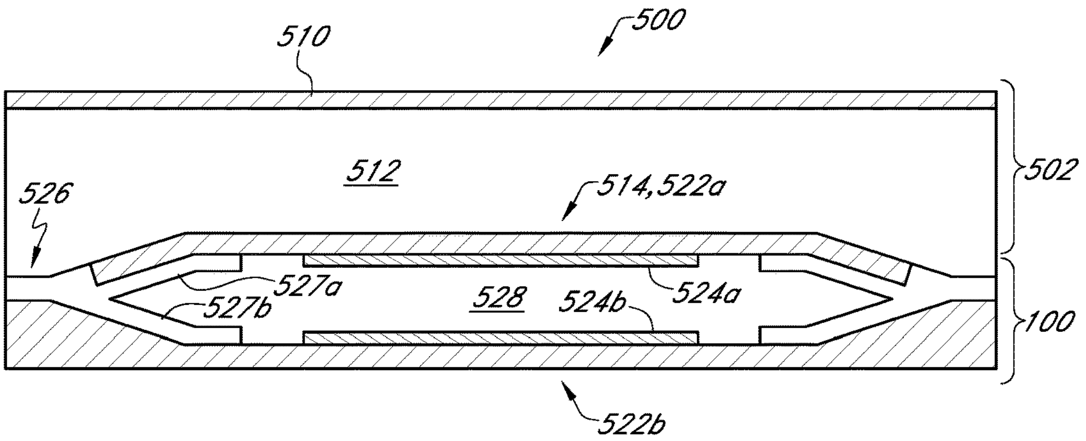
FIG. 16 shows a circuit protection device that can be a more specific example of the circuit protection device of FIG. 14.
Figure 17:
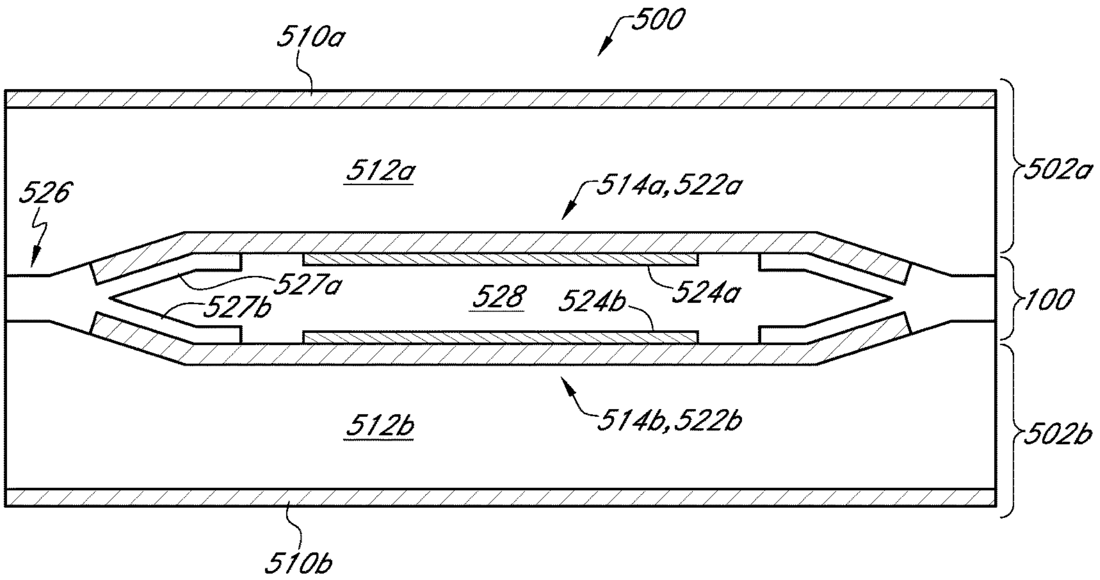
FIG. 17 shows a circuit protection device that can be a more specific example of the circuit protection device of FIG. 15.

FIG. 16 shows a circuit protection device 500 that can be a more specific example of the circuit protection device 500 of FIG. 14, and FIG. 17 shows a circuit protection device 500 that can be a more specific example of the circuit protection device 500 of FIG. 15.

FIG. 16 shows that in some embodiments, a circuit protection device 500 can include a GDT portion 100 and a varistor portion 502. In some embodiments, such a varistor portion can be configured as a metal oxide varistor (MOV) having a metal oxide layer 512 implemented between an electrode 510 and an electrode 514. The electrode 514 is shown to be a common electrode for the MOV 502 and the GDT 100. Accordingly, the common electrode 514 is also indicated as a first electrode 522*a* for the GDT 100. The GDT 100 is shown to further include a second electrode 522*b*, such that a sealed chamber 528 is between the first and second electrodes 522*a*, 522*b*.

In the example of FIG. 16, each of the first and second electrodes 522*a*, 522*b* is shown to include a concave surface similar to the example of FIG. 13. Also similar to the example of FIG. 13, the first and second electrodes 522*a*, 522*b* are shown to be joined and sealed by an insulating seal structure 526 configured to provide a separate covering portion for each of the first and second electrodes 522*a*, 522*b*. More particularly, the first covering portion 527*a* is shown to cover an edge portion of the concave surface of the first electrode 522*a*, and the second covering portion 527*b* is shown to cover an edge portion of the concave surface of the second electrode 522*b*. Accordingly, and as described herein, such separate covering portions can provide a desirable increase in an internal leakage path length between the first and second electrodes 522*a*, 522*b*.

In the example of FIG. 16, each of the concave surfaces of the first and second electrodes 522*a*, 522*b* not covered by the respective covering portion (527*a* or 527*b*) can be a discharging portion of the respective electrode. As described herein, such a discharging portion may or may not include one or more layers (524*a*, 524*b*) such as a silver texture layer and an emissive coating layer.

In the example of FIG. 16, the common electrode 514/522*a* is shown to provide the concave surface for the GDT 100. The other surface of the common electrode 514/522*a* is shown to provide a convex surface having an edge portion that flares away from the other electrode 510 of the MOV 502. Such an flared edge configuration can desirably reduce the likelihood of damage to the MOV 502 at or near the edge portion.

FIG. 17 shows that in some embodiments, a circuit protection device 500 can include a GDT portion 100 and a varistor portion on each side of the GDT portion 100. Accordingly a first varistor 502*a* is shown to be on the first side of the GDT portion 100, and a second varistor 502*b* is shown to be on the second side of the GDT portion 100.

In some embodiments, each of such varistor portions can be configured as a metal oxide varistor (MOV). Accordingly, the first MOV 502*a* is shown to have a first metal oxide layer 512*a* implemented between an electrode 510*a* and an electrode 514*a*. The electrode 514*a* is shown to be a common electrode for the MOV 502*a* and the GDT 100. Accordingly, the common electrode 514*a* is also indicated as a first electrode 522*a* for the GDT 100. The GDT 100 is shown to further include a second electrode 522*b*, such that a sealed chamber 528 is between the first and second electrodes 522*a*, 522*b*.

In the example of FIG. 17, each of the first and second electrodes 522*a*, 522*b* is shown to include a concave surface similar to the example of FIG. 13. Also similar to the example of FIG. 13, the first and second electrodes 522*a*, 522*b* are shown to be joined and sealed by an insulating seal structure 526 configured to provide a separate covering portion for each of the first and second electrodes 522*a*, 522*b*. More particularly, the first covering portion 527*a* is shown to cover an edge portion of the concave surface of the first electrode 522*a*, and the second covering portion 527*b* is shown to cover an edge portion of the concave surface of the second electrode 522*b*. Accordingly, and as described herein, such separate covering portions can provide a desirable increase in an internal leakage path length between the first and second electrodes 522*a*, 522*b*.

In the example of FIG. 17, each of the concave surfaces of the first and second electrodes 522*a*, 522*b* not covered by the respective covering portion (527*a* or 527*b*) can be a discharging portion of the respective electrode. As described herein, such a discharging portion may or may not include one or more layers (524*a*, 524*b*) such as a silver texture layer and an emissive coating layer.

In the example of FIG. 17, the first common electrode 514*a*/522*a* is shown to provide the concave surface for the first side of the GDT 100, and the second common electrode 514*b*/522*b* is shown to provide the concave surface for the second side of the GDT 100. The other surface of the first common electrode 514*a*/522*a* is shown to provide a convex surface having an edge portion that flares away from the other electrode 510*a* of the first MOV 502*a*. Such an flared edge configuration can desirably reduce the likelihood of damage to the first MOV 502*a* at or near the edge portion. Similarly, the other surface of the second common electrode 514*b*/522*b* is shown to provide a convex surface having an edge portion that flares away from the other electrode 510*b* of the second MOV 502*b*. Such an flared edge configuration can desirably reduce the likelihood of damage to the second MOV 502*b* at or near the edge portion.

For the purpose of description herein, a concave surface can include a center portion and an edge portion, where the edge portion flares towards a plane on the concave facing side and parallel to a plane defined by the center portion. Similarly, a convex surface can include a center portion and an edge portion, where the edge portion flares away from a plane on the convex facing side and parallel to a plane defined by the center portion. The edge portion can include a shape having one or more straight segments, one or more curved sections, or some combination thereof.

FIGS. 18A-18H show various stages of a process that can be utilized to fabricate a plurality of circuit protection devices such as the circuit protection device 500 of FIG. 17. In some embodiments, such a fabrication process can include at least some of process steps that are performed while a plurality of units are attached in an array format.

Figures 18A, 18B, 18C, 18D:
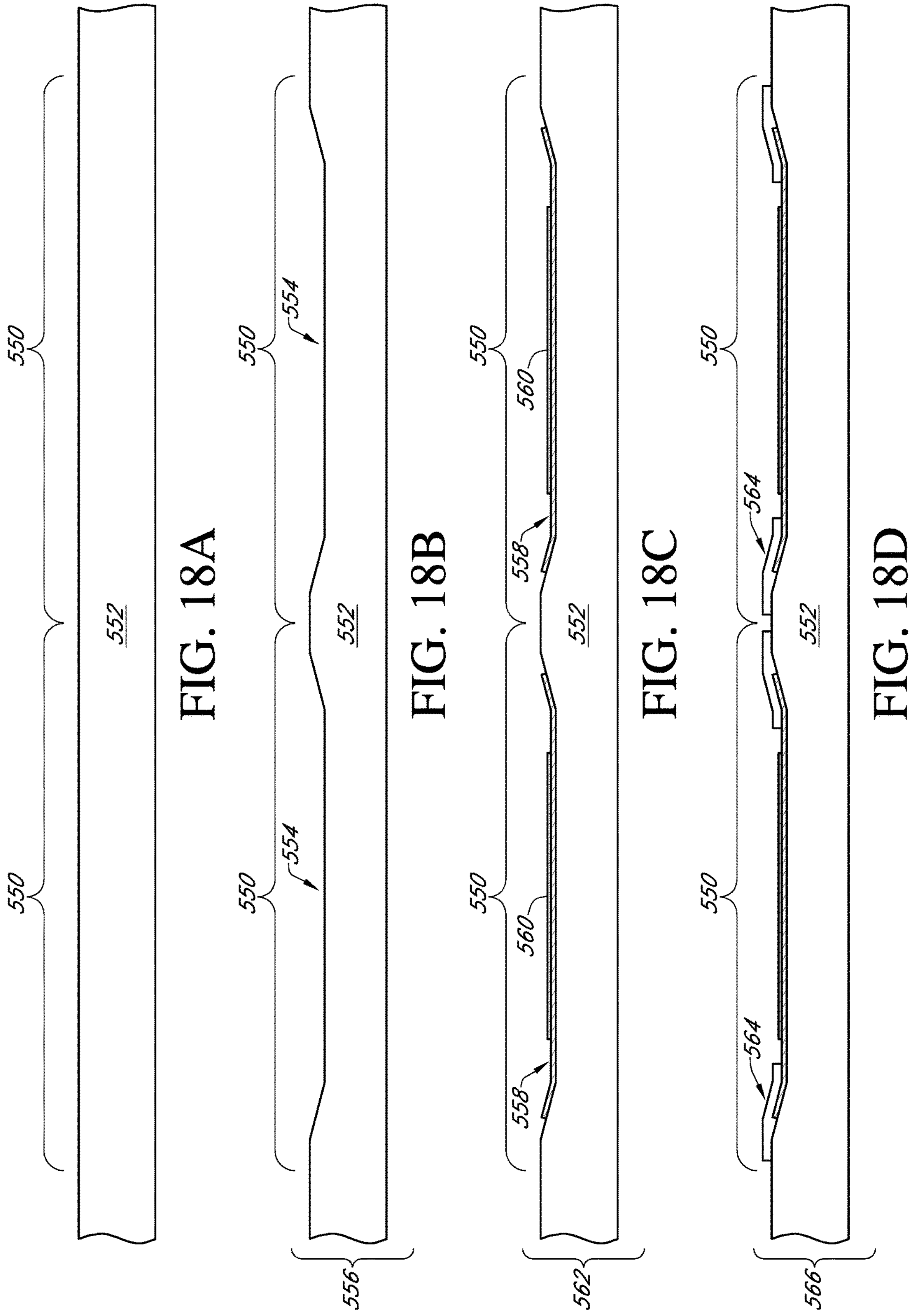
FIGS. 18A-18H show various stages of a process that can be implemented to fabricate a plurality of circuit protection devices.

FIG. 18A shows a process step where a plate of metal oxide 552 can be provided or formed. Such a plate is shown to include a plurality of units 550 where each unit will eventually become a circuit protection device having GDT and MOV functionalities.

In a process step of FIG. 18B, a shaped depression 554 can be formed on one side of the metal oxide 552 for each unit 550, so as to form an assembly 556.

In a process step of FIG. 18C, an electrode 558 can be formed on the metal oxide 552 so as to partially or fully cover the shaped depression (554 in FIG. 18B) for each unit 550, so as to form an assembly 562. In some embodiments, such an assembly can further include an emissive coating 560 formed on a laterally inner portion of the electrode 558. It will be understood that in some embodiments, the emissive coating 560 may or may not be the utilized. It is noted that the electrode 558 includes an inner portion and an outer portion implemented as described herein.

In a process step of FIG. 18D, a layer 564 of sealing material can be formed on the perimeter portion of each unit 550 of the assembly 562, so as to form an assembly 566. In some embodiments, each of such sealing layers 564 can be formed with material including glass.

Figure 18E:
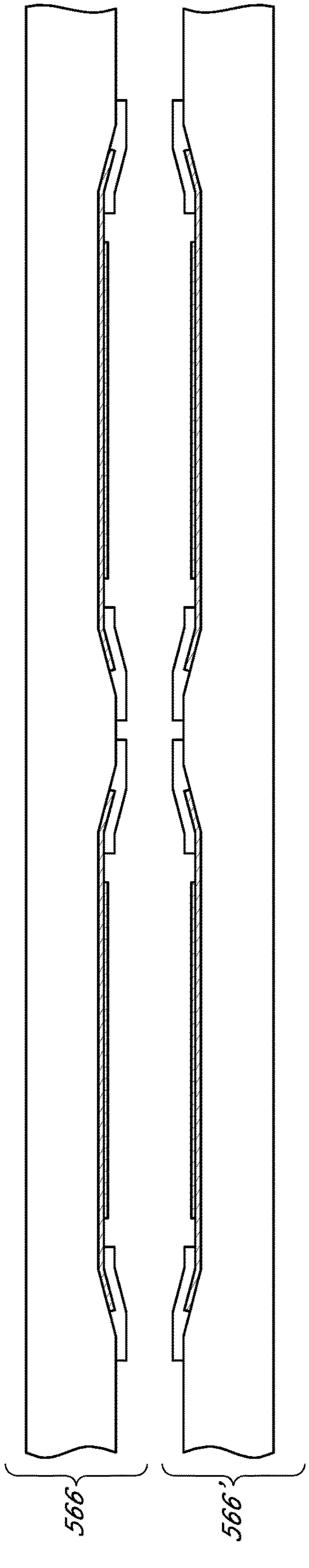

In a process step of FIG. 18E, two of the assemblies 566 of FIG. 18D can be assembled to allow joining of the inner facing portions of the two assemblies (566, 566'). More particularly, a first assembly 566 (similar to the assembly 566 of FIG. 18D) can be inverted and positioned over a second assembly 566' (also similar to the assembly 566 of FIG. 18D).

Figure 18F:
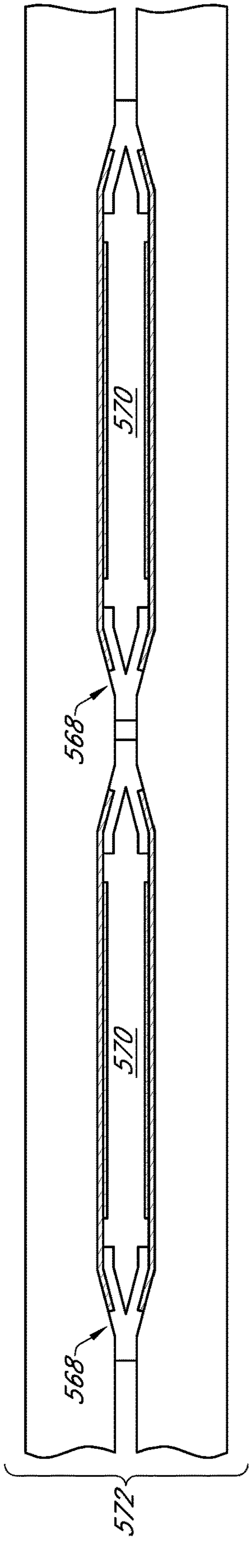

In a process step of FIG. 18F, the assembly (566 and 566') of FIG. 18E can be further processed to form a seal 568 and a corresponding sealed chamber 570 for each unit, so as to form an assembly 572.

Figure 18G:
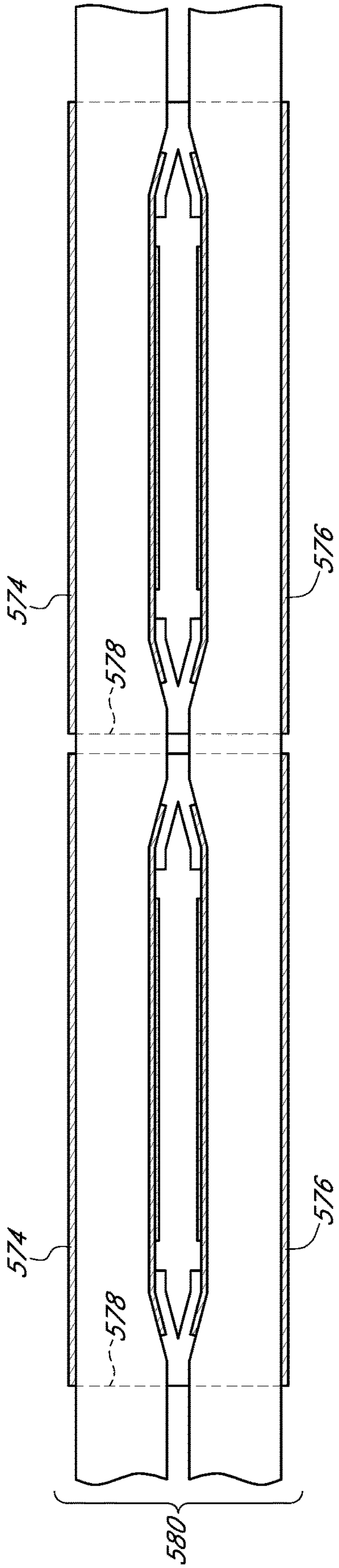

In a process step of FIG. 18G, first and second external electrodes 574, 576 can be formed for each unit on the assembly 572 of FIG. 18F, so as to form an assembly 580. In some embodiments, such external electrodes can be dimensioned laterally to allow singulation of the units along singulation lines 578.

Figure 18H:
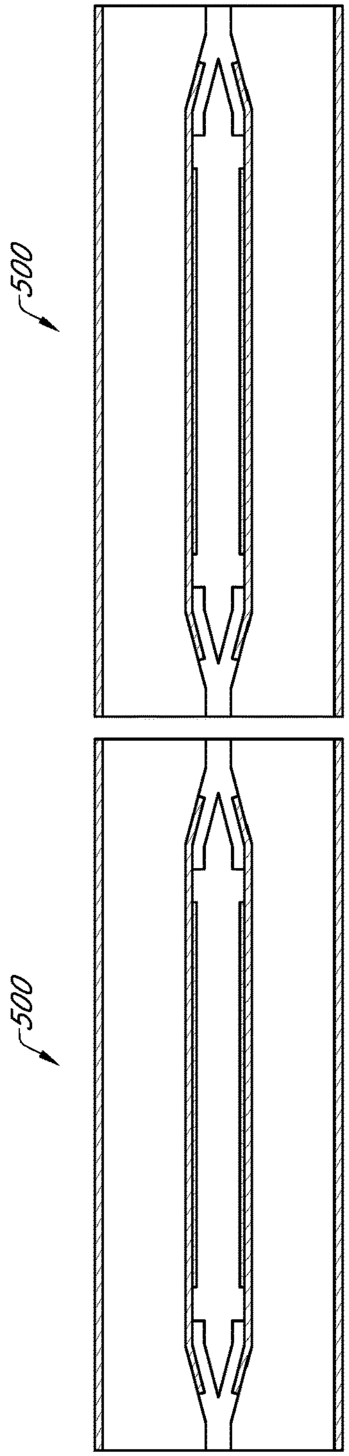

In a process step of FIG. 18H, the plurality of units of the assembly 580 of FIG. 18G can be singulated to yield a plurality of individual circuit protection devices 500 having GDT and MOV functionalities, with each circuit protection device being similar to the circuit protection device 500 of FIG. 17.

In some examples disclosed herein, including the examples of FIGS. 9, 10 and 18, a plurality of units are described as being processed while in an array format. For the purpose of description, an array can include an arrangement of M×N units, where M is an integer greater than or equal to 1, and N is an integer greater than 1. Such an array of M×N units can be arranged in, for example, a single-row array format having a plurality of units in a single row, a single-column array format having a plurality of units in a single column, or a rectangular array format having a plurality of rows and a plurality of columns. It will be understood that an array can also include an arrangement of a plurality of units arranged in a non-rectangular manner.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

The invention claimed is:

1. A gas discharge tube (GDT) comprising:

first and second electrodes each including an edge and an inward facing surface, such that the inward facing surfaces face each other;

a sealing portion implemented to join the edge portions of the first and second electrodes to form a chamber between the inward facing surfaces of the first and second electrodes; and an electrically insulating portion implemented to provide a surface that covers a portion of the inward facing surface of each of at least one of the first and second electrodes such that a leakage path between the first and second electrodes includes a path on the surface of the electrically insulating portion.

2. The GDT of claim 1, wherein the electrically insulating portion is implemented for each of both of the first and second electrodes.

3. The GDT of claim 1, wherein the sealing portion is formed from an electrically insulating material.

4. The GDT of claim 3, wherein the electrically insulating material of the sealing portion includes glass.

5. The GDT of claim 3, wherein the sealing portion is configured to join the first and second electrodes directly.

6. The GDT of claim 3, further comprising a spacer implemented between the first and second electrodes, the spacer being formed from an electrically insulating material and having a first side and a second side, and defining an opening with an inner wall that extends from the first side to the second side, such that the chamber is further defined by the inner wall.

7. The GDT of claim 6, wherein the electrically insulating material of the spacer includes a ceramic material.

8. The GDT of claim 6, wherein the sealing portion includes a sealing layer implemented between each of the first and second sides of the spacer and the corresponding electrode.

9. The GDT of claim 8, wherein the sealing layer is formed from an electrically conducting material.

10. The GDT of claim 9, wherein the electrically insulating material of the sealing layer includes glass.

11. The GDT of claim 3, wherein each electrically insulating portion extends laterally inward from the sealing portion.

12. The GDT of claim 11, wherein the electrically insulating portion and the sealing portion are formed from same material.

13. The GDT of claim 12, wherein the same material of the electrically insulating portion and the sealing portion includes glass.

14. A circuit protection device comprising:

a gas discharge tube (GDT) including first and second electrodes each having an edge and an inward facing surface, such that the inward facing surfaces face each other, the GDT further including a sealing portion implemented to join the edge portions of the first and second electrodes to form a chamber between the inward facing surfaces of the first and second electrodes, the GDT further including an electrically insulating portion implemented to provide a surface that covers a portion of the inward facing surface of each of at least one of the first and second electrodes such that a leakage path between the first and second electrodes includes a path on the surface of the electrically insulating portion; and a first clamping device electrically connected to the first electrode of the GDT.

15. The circuit protection device of claim 14, wherein the first clamping device is connected directly to the first electrode.

16. The circuit protection device of claim 15, wherein the first clamping device is a metal oxide varistor (MOV) having first and second electrodes, and a metal oxide layer implemented between the first and second electrodes.

17. The circuit protection device of claim 16, wherein one of the first and second electrodes of the MOV is configured as a terminal of the circuit protection device, and the other electrode of the MOV is a separate electrode electrically connected to the first electrode of the GDT.

18. The circuit protection device of claim 16, wherein one of the first and second electrodes of the MOV is configured as a terminal of the circuit protection device, and the first electrode of the GDT is also the other electrode of the MOV.

19. The circuit protection device of claim 14, further comprising a second clamping device electrically connected to the second electrode of the GDT.

20. The circuit protection device of claim 19, wherein the second clamping device is a metal oxide varistor (MOV) having first and second electrodes, and a metal oxide layer implemented between the first and second electrodes.

* * * * *